(12) United States Patent
Gupta

(10) Patent No.: US 7,870,046 B2
(45) Date of Patent: Jan. 11, 2011

(54) SYSTEM, APPARATUS AND METHOD FOR STANDARDIZED FINANCIAL REPORTING

(75) Inventor: Anil Gupta, Chelmsford, MA (US)

(73) Assignee: CAE Solutions Corporation, Chelmsford, MA (US)

( * ) Notice: Subject to any disclaimer, the term of this patent is extended or adjusted under 35 U.S.C. 154(b) by 1047 days.

(21) Appl. No.: 10/794,539

(22) Filed: Mar. 4, 2004

(65) Prior Publication Data

US 2005/0197931 A1 Sep. 8, 2005

(51) Int. Cl.
*G06Q 40/00* (2006.01)
(52) U.S. Cl. ........................................ 705/35; 705/36 T
(58) Field of Classification Search ................. 707/102; 705/36

See application file for complete search history.

(56) References Cited

U.S. PATENT DOCUMENTS

| 5,802,511 | A | * | 9/1998 | Kouchi et al. | 707/2 |
| 6,122,635 | A | | 9/2000 | Burakoff et al. | 707/102 |
| 6,665,681 | B1 | * | 12/2003 | Vogel | 707/101 |
| 6,778,994 | B2 | | 8/2004 | Gogolak | 707/102 |
| 7,480,630 | B2 | | 1/2009 | Wallacher | 705/35 |

OTHER PUBLICATIONS http://web.archive.org/web/20000522223409/http://www.ancientegypt.co.uk/writing/rosetta.html Rosetta Stone.*
United States Government Accountability Office, Report to the Chairman, United States Securities and Exchange Commission; Financial Audit; Securities and Exchange Commission's Financial Statements for Fiscal Years 2007 and 2006; Nov. 2007.

* cited by examiner

*Primary Examiner*—James A Kramer
*Assistant Examiner*—James A Vezeris
(74) *Attorney, Agent, or Firm*—Sunstein Kann Murphy & Timbers LLP

(57) ABSTRACT

Standardized financial reports are automatically generated from company financial reports using a taxonomy library that maps company-specific terms to corresponding standard terms. Line items in the standardized financial reports include standardized terms derived from company-specific terms in the company financial report as well as corresponding financial information obtained from the company financial report. The financial information in the standardized financial report may be highlighted to indicate its source, and may also be cross-referenced back to its source location in the company financial report so that the information can be verified.

27 Claims, 8 Drawing Sheets

|  | December 31, | |
|---|---|---|
|  | 2002 | 2001 |
|  | (in thousands, except per share data) | |
| ASSETS | | |
| CURRENT ASSETS: | | |
| Cash and cash equivalents (Note 1) | $ 59,769 | $ 41,033 |
| Accounts receivable (Note 4) | 56,616 | 83,564 |
| Net assets held for sale (Note 2) | -- | 10,381 |
| Deferred income taxes (Note 8) | 4,557 | 13,030 |
| Refundable income taxes | 19,051 | 7,992 |
| Other | 7,219 | 5,238 |
| Total current assets | 147,212 | 161,238 |

FIG. 3

| | | | | |
|---|---|---|---|---|
| Current Tax Assets | $5,167 | $5,867 | $4,557 | $23,608 |
| Deferred Income Taxes | $5,167 | $5,867 | $4,557 | $4,557 |
| Income Tax Receivable | | | | $19,051 |

FIG. 4

|  | December 31, | |
|---|---|---|
|  | 2002 | 2001 |
|  | (in thousands, except per share data) | |
| ASSETS | | |
| CURRENT ASSETS: | | |
| Cash and cash equivalents (Note 1) | $ 59,769 | $ 41,033 |
| Accounts receivable (Note 4) | 56,616 | 83,564 |
| Net assets held for sale (Note 2) | -- | 10,381 |
| Deferred income taxes (Note 8) | 4,557 | 13,030 |
| Refundable income taxes | 19,051 | 7,992 |
| Other | 7,219 | 5,238 |
| Total current assets | 147,212 | 161,238 |

FIG. 5

SYSTEM, APPARATUS AND METHOD FOR STANDARDIZED FINANCIAL REPORTING

FIELD OF THE INVENTION

The present invention relates generally to computer systems, and more particularly to a computer-based system, apparatus, and method for standardized financial reporting.

BACKGROUND OF THE INVENTION

Most companies publish financial information in one form or another. For example, publicly traded United States companies are typically required to report financial information to the Securities and Exchange Commission (SEC) quarterly, annually, and at other times. Company financial information may be published electronically, for example, on a company or SEC web site, or may be published in other forms. Financial reports for many United States and foreign public and private companies are available through the SEC EDGAR system. The financial reports typically include line items for various assets, liabilities, and other financial information, and can be useful in evaluating and monitoring company performance. One issue with company financial reports is that different companies often use different terminology to report the same or similar types of financial information. For example, one company might report certain assets using a term like "refundable income taxes," while another company might report the same information using a term like "overpaid income taxes." The use of different terminology to report the same types of information can make it difficult to analyze company performance or compare the performance of different companies.

One solution has been to manually generate a standardized financial report for each company by mapping each company-specific term from the company's financial report to a corresponding standard term in the standardized financial report. For example, the terms "refundable income taxes" and "overpaid income taxes" from above might be mapped to a standard term called "income tax receivable." In this way, the standardized financial report for each of those companies would include a line item called "income tax receivable" showing the amount from the corresponding line item in the respective financial report, making it easier to compare the finances of the two companies. While such manual mapping of financial terms tends to normalize the financial information, it is extremely tedious and often takes days to complete.

SUMMARY OF THE INVENTION

In various embodiments of the present invention, standardized financial reports are automatically generated from company financial reports using a taxonomy library that maps company-specific terms to corresponding standard terms. Line items in the standardized financial reports include standardized terms derived from company-specific terms in the company financial report as well as corresponding financial information obtained from the company financial report. The financial information in the standardized financial report may be highlighted to indicate its source, and may also be cross-referenced back to its source location in the company financial report so that the information can be verified.

In accordance with one aspect of the invention there is provided a method for producing a standardized financial report from a company financial report. The company financial report includes a plurality of line items, where each line item includes at least a company-specific term and a corresponding value. The method involves maintaining a taxonomy library in a computer-readable medium, wherein the taxonomy library maps each of a number of company-specific terms to at least one corresponding standard term; mapping a company-specific term from a line item in the company financial report to a corresponding standard term in the taxonomy library; and generating a standardized financial report having a plurality of standardized line items, wherein at least one standardized line item incorporates the standard term and the corresponding value from the line item in the company financial report. The company financial report may be obtained from a remote server over a communication network, such as the Internet. The standardized line item may include the actual value from the company financial report, or the standardized line item may include a value that is derived from the value in the company financial report.

Mapping a company-specific term from a line item in the company financial report to a corresponding standard term in the taxonomy library typically involves parsing the company financial report to identify each line item and parsing each line item to obtain its respective company-specific term and corresponding value. Mapping a company-specific term from a line item in the company financial report to a corresponding standard term in the taxonomy library may also involve building a hierarchical linked list of line items in the company financial report. Mapping a company-specific term from a line item in the company financial report to a corresponding standard term in the taxonomy library may also involve converting the company-specific term to a neutral identifier and searching the taxonomy library for the neutral identifier.

The method may also involve highlighting the value in the standardized financial report and/or cross-referencing the value in the standardized financial report to its source location in the company financial report. The value may be highlighted, for example, by encoding the value so that it will be displayed in a distinctive color. The value may be cross-referenced to its source location in the company financial report, for example, by hyperlinking the selected line items and value to its source location in the company financial report.

It is typical for both the company financial report and the standardized financial report to be stored in a database so that they can be accessed through a web interface or by other means. A mechanism may be provided whereby a portion of the company financial report including a particular value is displayed upon receipt of a user input selecting that value from a standardized line item in the standardized financial report.

In accordance with another aspect of the invention there is provided apparatus for producing a standardized financial report from a company financial report. The company financial report includes a plurality of line items, where each line item includes at least a company-specific term and a corresponding value. The apparatus comprises a computer-readable medium storing a taxonomy library, wherein the taxonomy library maps each of a number of company-specific terms to at least one corresponding standard term; and financial reporting logic for mapping a company-specific term from a line item in the company financial report to a corresponding standard term in the taxonomy library and generating a standardized financial report having a plurality of standardized line items, wherein at least one standardized line item incorporates the standard term and the corresponding value from the line item in the company financial report. The financial reporting logic may include the actual value from the company financial report in the standardized line item, or the financial reporting logic may include a a value that is derived from the value in the company financial report.

The financial reporting logic typically parses the company financial report to identify each line item and parses each line item to obtain its respective company-specific term and corresponding value. The financial reporting logic may also build a hierarchical linked list of line items in the company financial report. The financial reporting logic may also convert the company-specific term to a neutral identifier and search the taxonomy library for the neutral identifier.

The financial reporting logic may highlight the value in the standardized financial report and/or cross-reference the value in the standardized financial report to its source location in the company financial report. The value may be highlighted, for example, by encoding the value so that it will be displayed in a distinctive color. The value may be cross-referenced to its source location in the company financial report, for example, by hyperlinking the selected line items and value to its source location in the company financial report.

It is typical for both the company financial report and the standardized financial report to be stored in a database. The apparatus may include a web interface, and the financial reporting logic may display the standardized financial report through the web interface. The financial reporting logic may display at least a portion of the company financial report including a particular value upon receiving a user input selecting the value from the standardized line item.

In accordance with yet another aspect of the invention there is provided apparatus for producing a standardized report from a non-standardized report. The non-standardized report includes at least a non-standardized term and a corresponding value. The apparatus includes means for mapping the non-standardized term from the non-standardized report to a corresponding standard term and means for generating a standardized report incorporating the standard term and the corresponding value from the non-standardized report. The apparatus may also include means for highlighting the value in the standardized report and/or means for cross-referencing the value in the standardized report to its source location in the non-standardized report.

In accordance with still another aspect of the invention there is provided apparatus comprising a computer-readable medium having embodied therein a computer program for producing a standardized report from a non-standardized report. The non-standardized report includes at least a non-standardized term and a corresponding value. The computer program includes mapping logic for mapping the non-standardized term from the non-standardized report to a corresponding standard term and report generation logic for generating a standardized report incorporating the standard term and the corresponding value from the non-standardized report.

Other aspects of the invention will be apparent from the detailed description below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawings:

FIG. 3 shows a portion of an exemplary consolidated balance sheet from a company financial report;

FIG. 4 shows a portion of an exemplary standardized financial report (balance sheet) generated from the portion of the company financial report shown in FIG. 3 in accordance with an embodiment of the present invention;

FIG. 5 shows the portion of the exemplary consolidated balance sheet of FIG. 3 with a value highlighted in accordance with an embodiment of the present invention;

DETAILED DESCRIPTION OF A PREFERRED EMBODIMENT

Figure 1:
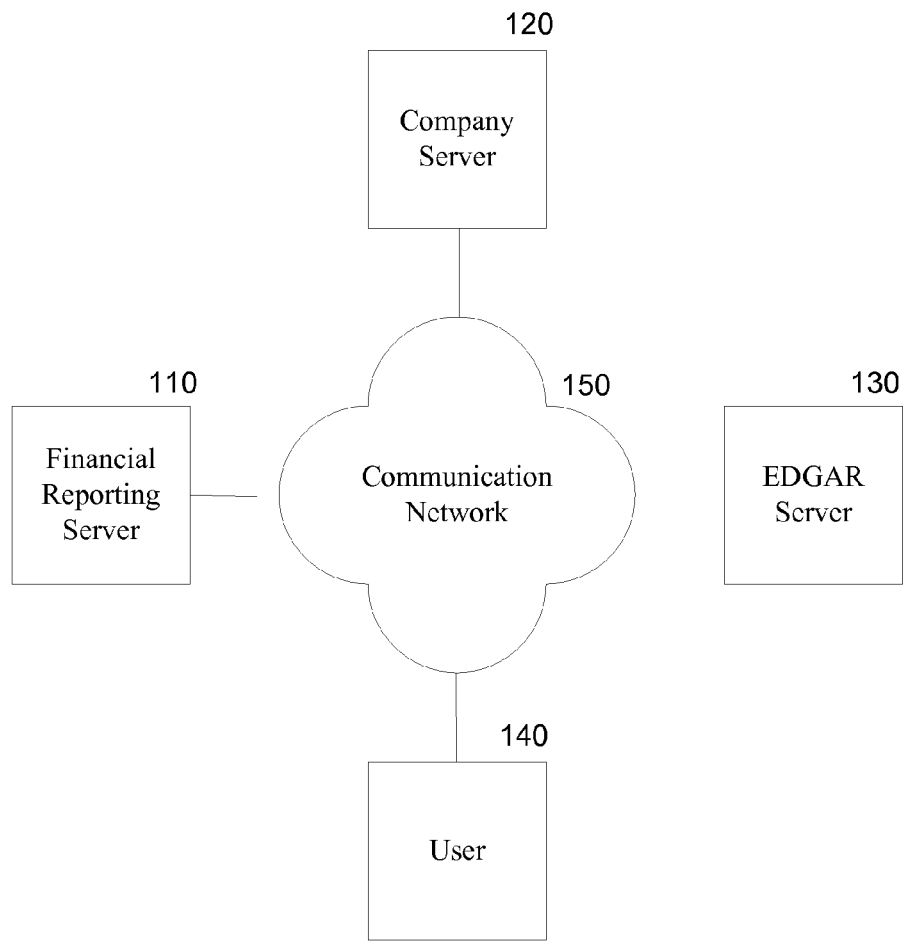
FIG. 1 shows an exemplary computer system in accordance with an embodiment of the present invention.

Embodiments of the present invention automatically generate standardized financial reports from company financial reports, such as quarterly reports, annual reports, 8K reports, or press (earnings) releases. Copies of the company financial reports are typically obtained and processed in electronic form (e.g., HTML or Text), for example, from a remote digital storage medium (such as a web server or file server) over a communication network such as the Internet or a private intranet. Electronic copies of company financial reports can also be obtained by scanning the company financial reports (e.g., using optical character recognition) or by other means. The copies of the company financial reports are typically stored in a local digital storage medium (such as a computer memory or hard drive) to facilitate subsequent retrieval and processing.

In order to generate a standardized financial report from a company financial report, the company financial report is parsed or otherwise processed to identify the financial information and obtain relevant information from each line item, such as a company-specific term, a corresponding value (typically, but not necessarily, a monetary value), and possibly ancillary information such as a note. Each company-specific term to be represented in the standardized financial report is then mapped to one or more standard terms using a taxonomy library (described below), and line items are generated for the standardized financial report incorporating the standard terms and the corresponding values from the company financial report. For values that are associated with a notes in the company financial report, the corresponding line item(s) in the standardized financial report may also include an indicator (such as an asterisk) to convey the association with a note. The standardized financial report can present the company's financial information in various formats, such as balance sheet, income statement, and/or cash flow. Each and every line item from the company financial report is typically represented in the standardized report, although that is not a requirement.

The taxonomy library typically maps each company-specific term to one or more corresponding standard terms. For example, in an exemplary embodiment of the present invention, the taxonomy library lists, for each standard term, one or more company-specific terms that map to that standard term. The lists of company-specific terms are typically compiled from the past company financial reports of many companies, and the taxonomy library typically requires manual maintenance to enter the company-specific terms and/or map each company-specific term to a standard term.

In general, various company-specific terms that are used by different companies to report a particular type of financial information are mapped to a single standard term. It is also possible for multiple line items in a particular company financial report to map to a single standard term if the standardized hierarchy does not have that granularity (for example, if two company line items are related to a single standard term), in which case the corresponding values from the multiple line items might be combined to produce the standardized line item. At the same time the knowledge of combined mapping is stored associated to the standardized item for future segregation when the standardized hierarchy is expanded. It is also possible for identical company-specific terms from different companies to map to different standard terms (for example, if two different companies use the same term but under a different sub-heading (parent) to describe different financial information), in which case the taxonomy library might include a company indicator along with each such company-specific term to allow each such company-specific term to be mapped to the correct standard term. This is possible since a parent-child relationship of 'as-in-filing' line items is identified at the onset. This relationship is reflected in the standardized hierarchy as well. Exemplary taxonomy libraries are described below.

Each standardized financial report is typically generated using a predetermined template of standard line items. For example, in an exemplary embodiment of the present invention, there are balance sheet, income statement, and cash flow templates specifically for banking/credit institutions and separate balance sheet, income statement, and cash flow templates for other types of companies. The templates are preferably in the form of Enhanced XBRL (extensible Business Reporting Language) listings. Exemplary templates are described below.

Each value in the standardized financial report is preferably color-coded to indicate the source of those values. For example, in an exemplary embodiment of the present invention, values obtained directly from the company financial report are displayed in blue, while values that are computed from other information (for example, a subtotal adding values from multiple line items) are displayed in green.

In addition to color-coding the values, values obtained directly from the company financial report are preferably cross-referenced back to their respective source locations in the company financial report. For example, in an exemplary embodiment of the present invention, each value obtained directly from the company financial report is displayed in the standardized financial report as a "hyperlink" that, when selected by a user, causes the company financial report to be displayed with the corresponding value highlighted. Similarly, each note indicator in the standardized financial report may also be displayed as a "hyperlink" that, when selected by a user, causes the company financial report to be displayed with the corresponding note highlighted. The highlighting is shown dynamically only for the line item or the note selected as opposed to highlighting all line items or notes mapped in the financial report at the onset when the file is loaded. Among other things, such "hyperlinking" allows the user to confirm the source of the information in the standardized financial report.

Various aspects of the present invention will be described with reference to the exemplary computer system shown in FIG. 1. Among other things, the computer system includes a financial reporting server 110, a company server 120, the SEC EDGAR server 130, and a user 140, all in communication over a communication network such as the Internet 150. Company financial reports can be stored on the company server 120 and/or on the EDGAR server 130, and the user 140 can access those company financial reports directly from those servers. The financial reporting server 110 obtains company financial reports from the company server 120 and/or the EDGAR server 130 and generates standardized financial reports that can be accessed by the user 140. The standardized financial reports are preferably in the United States GAAP (Generally Accepted Accounting Principles) standard format, using Enhanced XBRL data elements but is applicable to any customizable date set stored in any format, e.g. DTD, XML.

Figure 2:
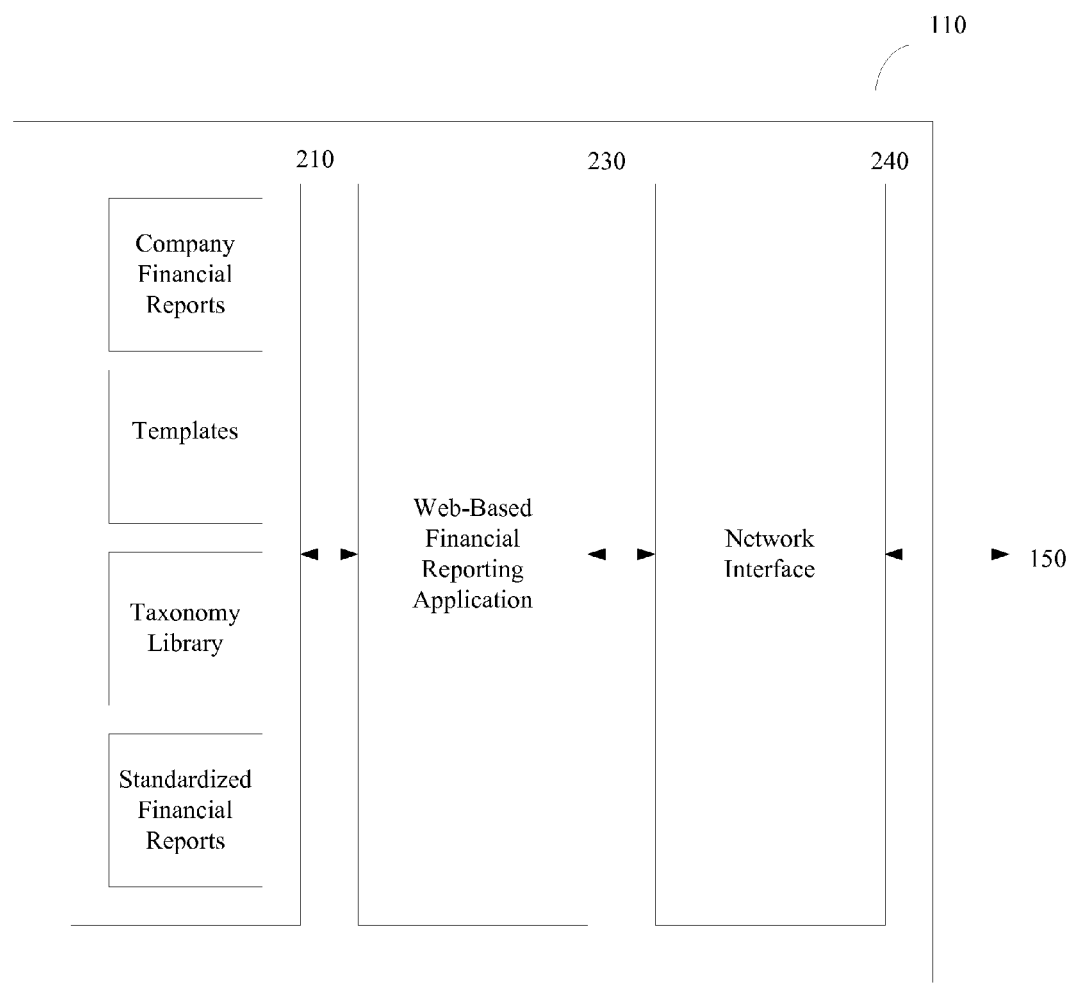
FIG. 2 shows the relevant components of a financial reporting server in accordance with an embodiment of the present invention.

FIG. 2 shows the relevant components of the financial reporting server 110 in accordance with an embodiment of the present invention. Among other things, the financial reporting server 110 includes database 210, a web-based financial reporting application 230, and a network interface 240. The network interface 240 allows the web-based financial reporting application 230 to send and receive information over the Internet 150. The web-based financial reporting application 230 is a web-based client-server application (using IIS—Internet Information Server, ASP—Active Server Pages, and Oracle) that generates standardized financial reports and allows access to the standardized financial reports through a web interface. The web-based financial reporting application 230 is implemented in Perl but is equally valid for any language, and runs on a Windows Server operating system. The database 210 is used by the web-based financial reporting application 230 to store company financial reports, standardized financial report templates, the taxonomy library, and standardized financial reports, among other things.

In order to generate standardized financial reports, the web-based financial reporting application 230 downloads electronic copies of company financial reports over the Internet 150, for example, from the company server 120 and/or the EDGAR server 130, and stores the company financial reports in the database 210. The web-based financial reporting application 230 obtains standardized financial report templates and the taxonomy library from the database 210. Appendix I shows exemplary balance sheet, income statement, and cash flow templates (datapoint hierarchies) for both generic companies and banking/saving institutions, in accordance with an embodiment of the present invention. Appendix II shows a representation of a portion of an exemplary taxonomy library listing various company-specific terms associated with six standard (Enhanced XBRL) terms, in accordance with an embodiment of the present invention (for convenience, the company-specific terms are not shown in a neutral identifier form as is described below, although they normally would be in the neutral identifier form). The web-based financial reporting application 230 uses the standardized financial report templates and taxonomy library to generate standardized financial reports from the company financial reports. The web-based financial reporting application 230 stores the standardized financial reports in the database 210 and allows users, such as the user 140, to access the standardized financial reports stored in the database 210.

More specifically, the web-based financial reporting application 230 parses the company financial report and locates the start and end offsets of any financial statements, such as balance sheet, income statement, and cash flow. This is typically done by matching regular expressions based on some specific keywords. For example, the web-based financial reporting application 230 typically looks for keywords such as CONDENSED CONSOLIDATED BALANCE SHEETS," "BALANCE SHEET," and similar words and phrases that sounds like the selected keywords to locate the start offset of a balance sheet and then looks for keywords such as "STATEMENTS OF CASH FLOWS," "CONDENSED CONSOLIDATED STATEMENTS OF EARNINGS," and other end conditions to locate the end offset. This process is repeated until all company financial tables are located within the company financial report, as a company financial report could include financial information for many independent subsidiary companies.

FIG. 3 shows a portion of an exemplary consolidated balance sheet from a company financial report. Specifically, this portion of the consolidated balance sheet shows various current assets listed under the general heading "ASSETS," including cash and cash equivalents, accounts receivable, net assets held for sale, deferred income taxes, refundable income taxes, and other current assets.

Once the web-based financial reporting application 230 has located the start and end offsets of the financial statements, the web-based financial reporting application 230 then parses each and every line item within the offsets, and builds a hierarchical linked list of "as in filing" line items including, for each line item, the company-specific term, the corresponding value, and possibly a note. Among other things, the hierarchical linked list represents "parent-child" relationships between the various line items (for example, that some company-specific term X is categorized as an asset).

The web-based financial reporting application 230 preferably then converts each company-specific term into a neutral identifier, specifically by removing punctuation, certain words (such as "and"), certain symbols (such as "&"), spaces, and other characters, and converting to all uppercase letters. For example, company-specific terms such as "Aircraft and equipment" and "Aircraft & equipment" are converted into the neutral identifier "AIRCRAFTEQUIPMENT." Among other things, the use of neutral identifiers facilitates the mapping process.

Once the hierarchical linked list of "as in filing" line items has been built and the company-specific terms have been converted into neutral identifiers, the web-based financial reporting application 230 attempts to map each neutral identifier to a standard term. The standard terms to be included in the standardized financial report are determined according to a standardized financial report template based on the type of financial report to be generated (i.e., balance sheet, income statement, cash flow) and the type of company.

In order to map a neutral identifier to a standard term, the web-based financial reporting application 230 searches the taxonomy library for the neutral identifier and, if found, obtains the corresponding standard term to which the neutral identifier maps. If the neutral identifier is not found in the taxonomy library, the web-based financial reporting application 230 preferably adds the neutral identifier to a "mapping failure" queue so that it can be manually added to the taxonomy library and mapped to a standard term so as to be available for generating future standardized financial reports for the company. If the neutral identifier is found in the taxonomy library, the web-based financial reporting application 230 then preferably checks the parent-child relationship for the neutral identifier. If the neutral parent does not add up to the sum of its entire neutral child, it is added to a "validation failure" queue so that the validation failure can be dealt with manually.

After mapping all the line items to the standard Enhanced XBRL elements (or at least mapping all of the line items that are able to be found in the taxonomy library), the web-based financial reporting application 230 generates a standardized financial report including, among other things, standard terms and the corresponding values from the company financial report and stores the standardized financial report in the database 210. The standardized financial report can then be accessed by a user through the web interface, for example, upon entering the ticker or CIK of the company.

In a particular embodiment of the present invention, three automated Perl-based processes, running on a Windows™ machine, operate on company financial reports when they are downloaded (namely a statement search process, a taxonomy generation process, and a data storage process), and various web-based interfaces are provided through which information can be accessed and manipulated (namely a mapping interface, a validation/mismatch interface, a statement interface, and a "fundamental financials" interface). Appendix III describes details of these processes and interface in accordance with an embodiment of the present invention.

FIG. 4 shows a portion of an exemplary standardized financial report (balance sheet) generated from the portion of the company financial report shown in FIG. 3 in accordance with an embodiment of the present invention. The standardized financial report includes the standard terms "Current Tax Assets," "Deferred Income Taxes," and "Income Tax Receivable." The "Deferred Income Taxes" and the "Income Tax Receivable" are derived directly from company-specific terms "Deferred income taxes" and "Refundable income taxes" in the company financial report, respectively, and hence the corresponding financial data is displayed in blue. The "Current Tax Assets" is derived from the "Deferred Income Taxes" and the "Income Tax Receivable," and hence the corresponding financial data is displayed in green. It should be noted that, in order to generate the standardized financial report portion shown in FIG. 4, the company-specific term "Deferred income taxes" was mapped to the standard term "Deferred Income Taxes" (which happen to be identical), while the company-specific term "Refundable income taxes" was mapped to the standard term "Income Tax Receivable."

As discussed above, each value in the standardized financial report that is derived directly from the company financial report is highlighted in blue and is "hyperlinked" to its source in the company financial report. When the user selects such a value, for example, by "clicking" on the value using a computer mouse, the web-based financial reporting application 230 displays a portion of the company specific report showing the line item including that value, with the value also preferably highlighted in blue. Thus, for example, if the user were to select the value "$4,557" in the right-most column of the "Deferred Income Taxes" line item in the portion of the standardized financial report shown in FIG. 4, the web-based financial reporting application 230 would display the corresponding line item in the company financial report with the corresponding value highlighted, for example, as shown in FIG. 5. In this way, the user can confirm the source of all values contained in the standardized financial report.

Figure 6:
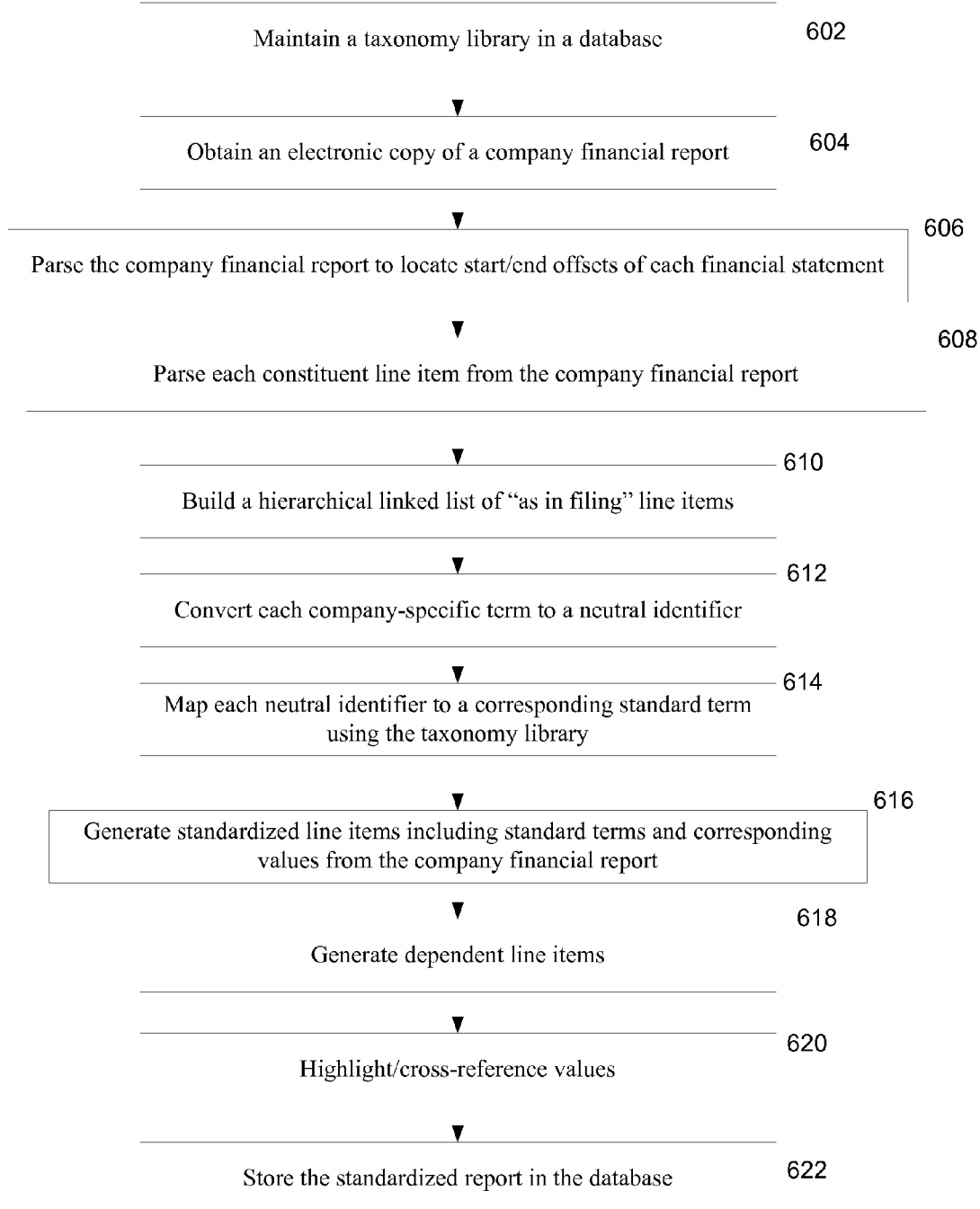
FIG. 6 is a logic flow diagram showing exemplary logic for generating a standardized financial report from a company financial report in accordance with an embodiment of the present invention.

FIG. 6 is a logic flow diagram showing exemplary logic for generating a standardized financial report from a company financial report in accordance with an embodiment of the present invention. In block 602, the logic maintains a taxonomy library in a database. In block 604, the logic obtains an electronic copy of a company financial report. Upon obtaining the company financial report in block 604, the logic parses the company financial report to locate start and end offsets of each financial statement, in block 606. The logic then parses each constituent line item from the company financial report, in block 608, and builds a hierarchical linked list of "as in filing" line items, in block 610. The logic then preferably converts each company-specific term to a neutral identifier, in block 612, and maps each neutral identifier to a corresponding standard term using the taxonomy library, in block 614. The logic then generates standardized line items including standard terms and corresponding values from the company financial report, in block 616, and generates any line items that are dependent therefrom, in block 618. The logic highlights values according to their source and also cross-references values that are derived directly from the company financial report, in block 620. The logic stores the standardized financial report in the database, in block 622.

Figure 7:
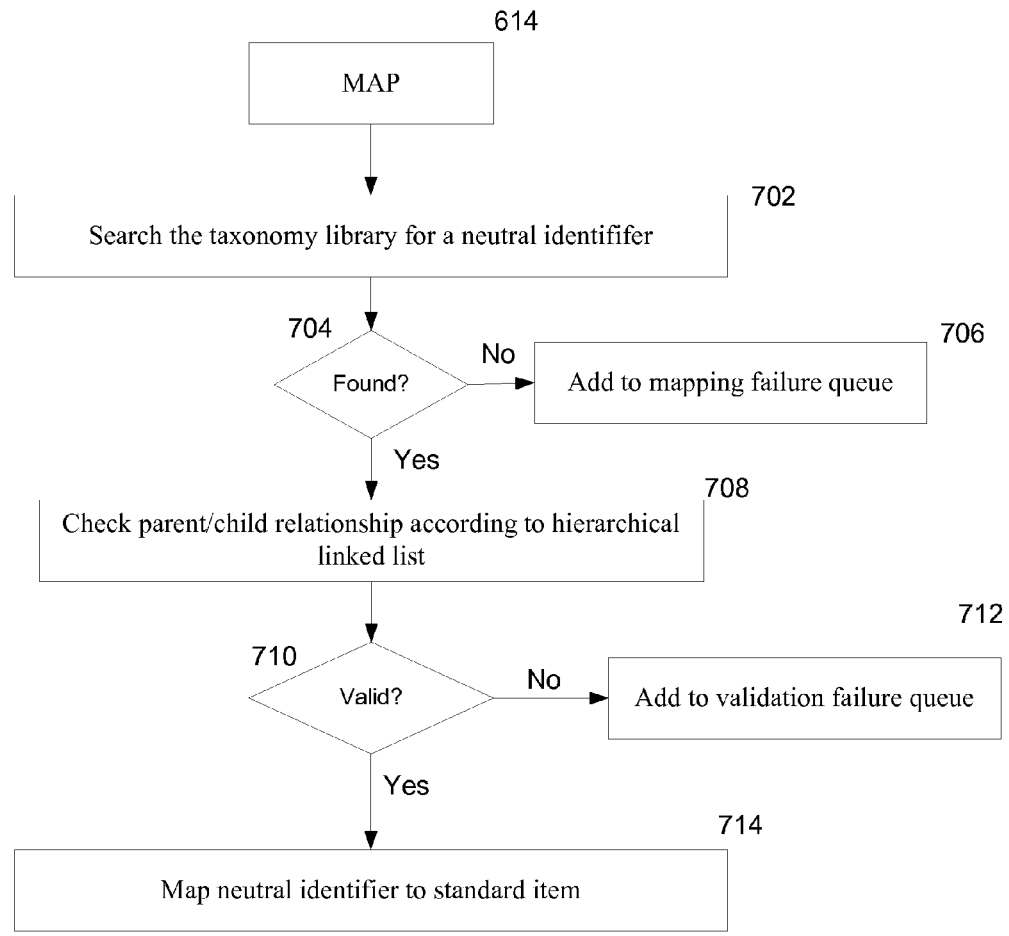
FIG. 7 is a logic flow diagram showing exemplary logic for mapping a neutral identifier to a standard term in block 614 of FIG. 6.

FIG. 7 is a logic flow diagram showing exemplary logic for mapping a neutral identifier to a standard term in block 614 of FIG. 6. The logic searches the taxonomy library for the neutral identifier, in block 702. If the neutral identifier is not found (NO in block 704), then the logic adds the neutral identifier to the mapping failure queue, in block 706. If the neutral identifier is found (YES in block 704), then the logic checks the parent/child relationship for the neutral identifier according to the hierarchical linked list, in block 708. If the parent/child relationship is invalid (NO in block 710), then the logic adds the neutral identifier to the validation failure queue, in block 712. If the parent/child relationship is valid (YES in block 710), then the logic maps the neutral identifier to the corresponding standard term, in block 714.

Figure 8:
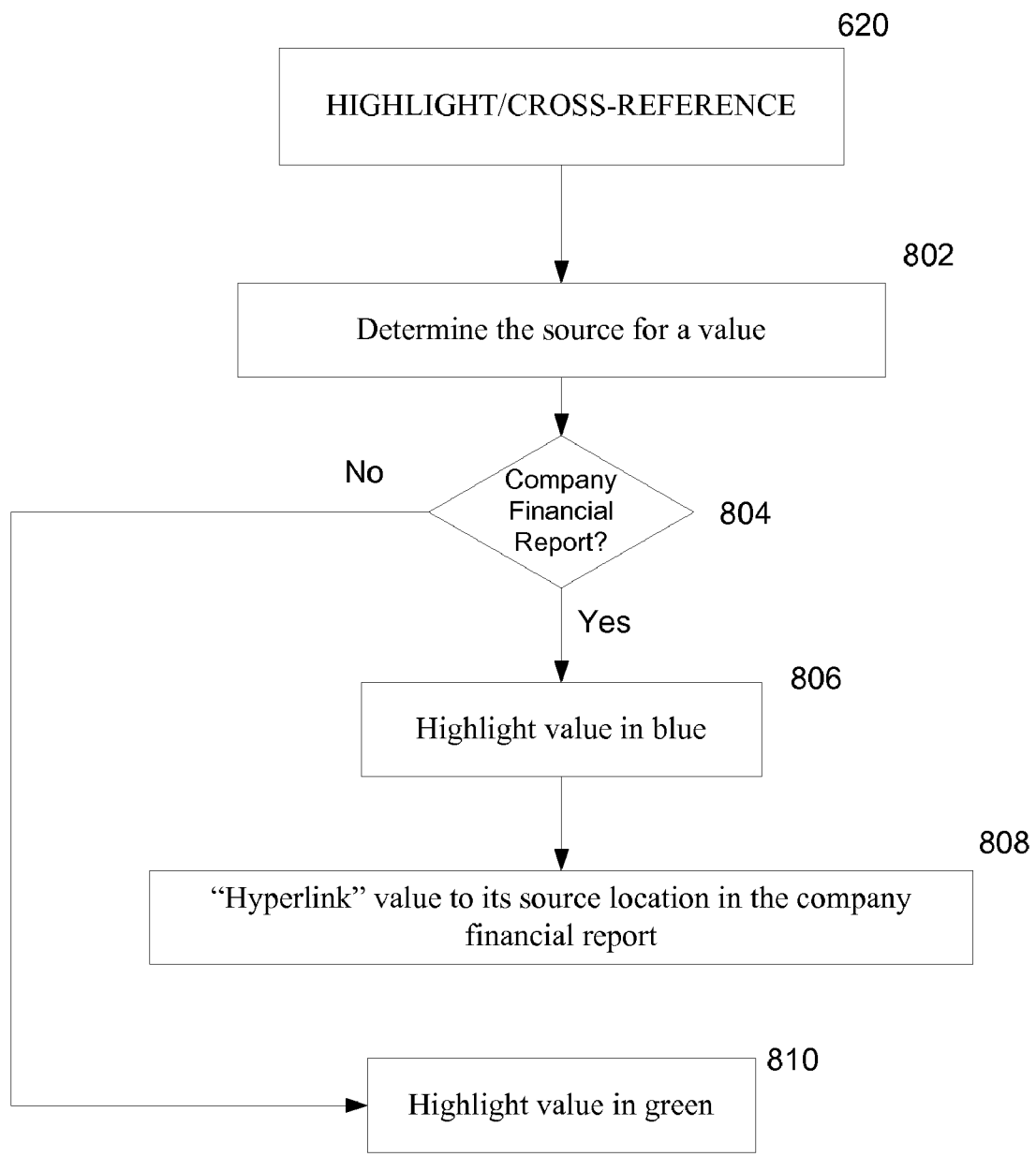
FIG. 8 is a logic flow diagram showing exemplary logic for highlighting and cross-referencing a value in block 620 of FIG. 6.

FIG. 8 is a logic flow diagram showing exemplary logic for highlighting and cross-referencing a value in block 620 of FIG. 6. The logic determines the source for the value, in block 802. If the value is derived directly from the company financial report (YES in block 804), then the logic highlights the value in blue, in block 806, and "hyperlinks" the value to its source location in the company financial report, in block 808. If, on the other hand, the value is derived from other line items in the standardized financial report (NO in block 804), then the logic highlights the value in green.

Figure 9:
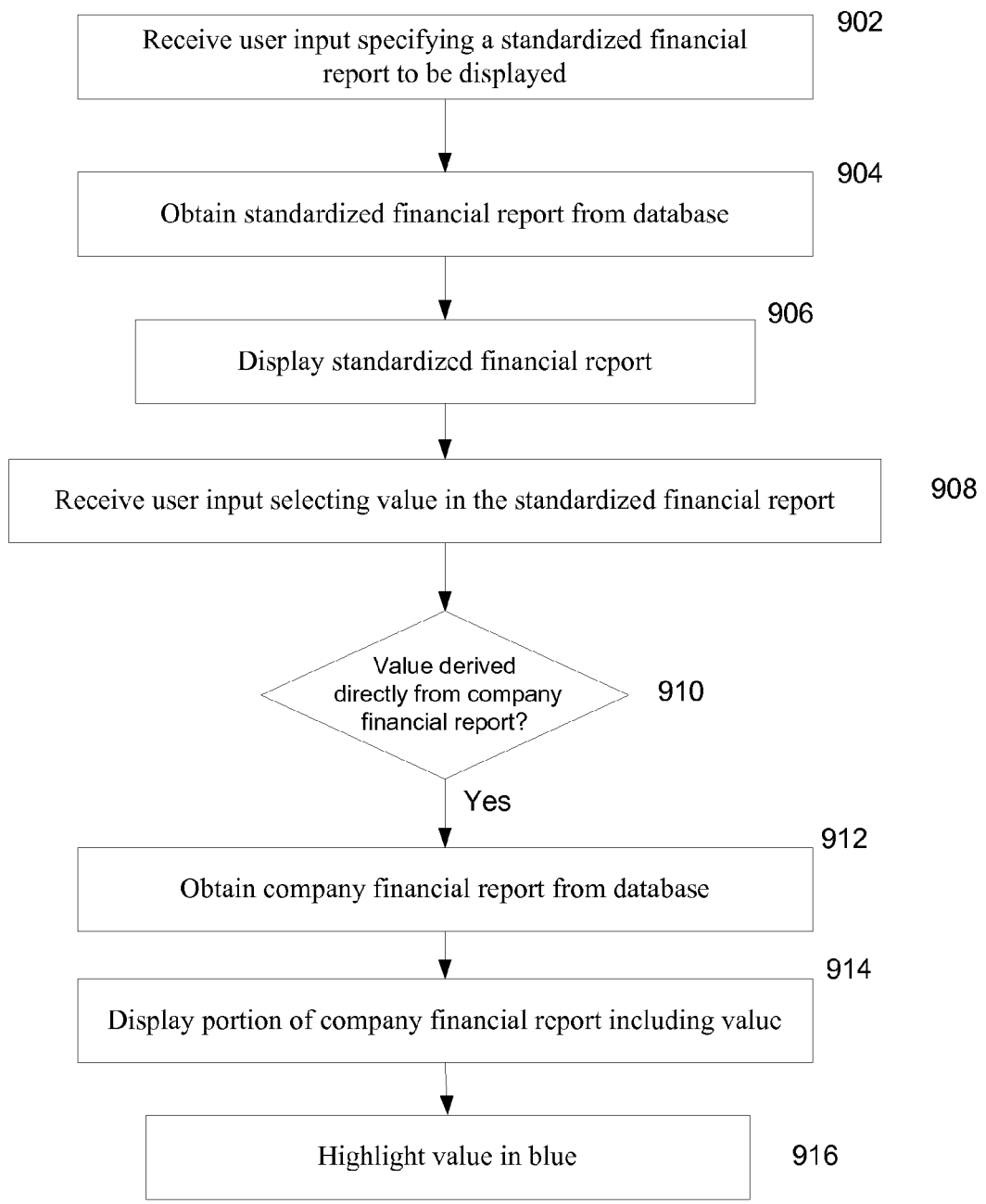
FIG. 9 is a logic flow diagram showing exemplary logic for displaying a standardized financial report to a user in accordance with an embodiment of the present invention.

FIG. 9 is a logic flow diagram showing exemplary logic for displaying a standardized financial report to a user in accordance with an embodiment of the present invention. When the logic receives a user input specifying a standardized financial report to be displaying, in block 902, the logic obtains the standardized financial report from the database, in block 904, and displays the standardized financial report to the user, in block 906. If and when the logic receives a user input selecting a value in the standardized financial report, in block 908, and assuming the value is derived directly from the company financial report and therefore is "hyperlinked" to its source location in the company financial report (YES in block 910), the logic obtains the company financial report from the database, in block 912, displays a portion of the company financial report including the value, in block 914, and highlights the value in blue, in block 916.

As discussed above, while different company-specific terms that are used by different companies to report a particular type of financial information are typically mapped to a single standard term, it is also possible for multiple line items in a particular company financial report to map to a single standard term (for example, if two company line items are related to a single standard term), in which case the financial information from the multiple line items might be combined to produce the standardized line item. The following is an example of such mapping:

| Company Financial Report | |
|---|---|
| CSterm1 | X |
| CSterm2 | Y |
| Taxonomy Library | |
| Stdterm | CSterm1 |
| | CSterm2 |
| Standardized Financial Report | |
| Stdterm | X + Y |

In this example, the company financial report includes a first company-specific term (CSterm1) associated with a value X and a second company-specific term (CSterm2) associated with a value Y. In the taxonomy library, both company-specific terms CSterm1 and CSterm2 map to the same standard term (Stdterm). The resulting standardized financial report includes a line item including the standard term (Stdterm) associated with a value equal to the sum of X and Y. The value X+Y could be highlighted differently (e.g., displayed in a different color) and/or cross-referenced back to both source line items in the company financial report (e.g., by including two "hyperlinked" icons).

As discussed above, it is also possible for identical company-specific terms from different companies to map to different standard terms (for example, if two different companies use the same term to describe different financial information), in which case the taxonomy library might include a company indicator along with each such company-specific term to allow each such company-specific term to be mapped to the correct standard term. The following is an example of such mapping:

| Company A Financial Report | |
|---|---|
| CSterm | X |
| Company B Financial Report | |
| CSterm | Y |
| Taxonomy Library | |
| Stdterm1 | CSterm (Company A) |
| Stdterm2 | CSterm (Company B) |
| Standardized Financial Report for Company A | |
| Stdterm1 | X |
| Standardized Financial Report for Company B | |
| Stdterm2 | Y |

In this example, the company financial report for Company A includes a company-specific term (CSterm) associated with a value X, and the company financial report for Company B includes an identical company-specific term (CSterm) associated with a value Y. In the taxonomy library, the company-specific term (CSterm) for Company A maps to a first standard term (Stdterm1), while the company-specific term (CSterm) for Company B maps to a second standard term (Stdterm2). In this example, the taxonomy library includes a company identifier for each of the identical company-specific terms so that the mapping function can map a company-specific term to its correct standard term. The resulting standardized financial report for Company A includes a line item including the first standard term (Stdterm1) associated with the value X, while the resulting standardized financial report for Company B includes a line item including the second standard term (Stdterm2) associated with the value Y.

Rather than including a company identifier in the taxonomy library, the mapping function might include hard-coded logic for mapping each identical company-specific term to the correct standard term. The following is an example of conditional logic (presented as pseudocode) that might be included in the mapping function to map identical company-specific terms to different standard terms:

If (Company A)
    CSterm maps to Stdterm1
If (Company B)
    CSterm maps to Stdterm2

Although various aspects of the present invention are described herein with reference to certain financial reporting applications, it should be noted that the present invention is not limited to the described financial reporting applications or even to financial reporting applications in general. Rather, taxonomy libraries can be created for virtually any type of mapping or translation application, including, without limitation, mapping of non-financial information such as manufacturing information (e.g., different companies might use different terms to describe number of units produced), sales information (e.g., different companies might use different terms to describe number of items sold or leased), and nutritional information (e.g., different companies might use different terms to describe the same ingredient or nutritional value of a product), to name but a few. Taxonomy libraries can also be created for simple foreign language translations in both financial and non-financial applications (e.g., the taxonomy libraries described with reference to the exemplary embodiments above could include foreign terms for companies that report financials in a foreign language). Thus, taxonomy libraries can be used generally to generate standardized reports from non-standardized reports.

It should be noted that logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described functionality is implemented in software that is executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, HTML, XML, or Perl) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

APPENDIX I

Datapoints Hierarchy - Balance Sheet (Commercial)

Assets
  Current Assets
    Cash, Cash Equivalents and Short Term Investments
      Cash and Cash Equivalents
        Cash
        Cash Equivalents
      Short Term Investments
    Marketable Securities*
      Held to Maturity*
      Trading Securities*
      Available for Sale*
    Derivative Assets*
    Receivables, Net
      Accounts Receivable Trade, Net
        Accounts Receivable Trade
        Allowance for Doubtful Accounts
      Leasing Receivables, Net
      Notes Receivable, Net
        Notes Receivable***
        Allowance for Notes **
      Contract Receivables, Net
      Unbilled Receivables, Net
      Income Taxes Receivable, Net
      Accrued Interest
      Accrued Income
      Finance Receivables, Net
        Finance Receivables**
        Allowance for Finance**
      Other Receivables, Net
    Related Party Receivables*
      Accounts Receivable - Related Party*
      Notes Receivable - Related Party*
    Loan Receivables, Net**
      Loan Receivables**
      Consumer**
      Allowance for Loans**
      Mortgage Loans on Real Estate**
        Residential**
        Commercial**
        Construction**
    Equipment Available for Short-term Lease**
    Due from Officers/Stockholders*
    Inventories, Net
      Raw Materials
      Work in Process
      Finished Goods
      Supplies
      Other Inventories
      Obsolescence Reserve
      LIFO Reserve
    Current Tax Assets
      Deferred Income Taxes
      Income Tax Receivable
    Prepaid Inventory**
    Prepaid Expenses*
      Prepaid Insurance
      Prepaid Rent
      Other Prepaid Expenses
    Assets Held for Sale*
    Loans Held for Sale***
    Deferred Acquisition Costs***
    Real Estate at Cost***
    Deferred Asset Charges Net**
    Assets of Discontinued Operations***
    Restricted Cash***
    Program Rights***
    Reserves***
    Unearned Income***
    Real Estate Developments***
    Advances***
    Other Current Assets
  Non Current Assets
    Property, Plant and Equipment, Net
      Accumulated Depreciation and Amortization
        Accumulated Depreciation
        Accumulated Amortization***
        Accumulated Amortization, Capital Leased Assets
        Accumulated Amortization of Computer Software Costs
      Property, Plant and Equipment
        Land, Buildings and Improvements
          Land and Land Improvements
            Land
            Land Improvements
          Buildings
        Machinery and Equipment
        Furniture and Fixtures
        Office and Computer Equipment
        Vehicles
        Construction in Progress
        Leasehold Improvements
        Capital Leased Assets, Net
          Capital Leased Assets
        Computer Software Costs, Net
          Computer Software Costs
        Internal Use Computer Software
        Oil and Gas Properties**
        Land Held For Future Development**
        Other Property, Plant and Equipment
    Income Producing Properties**
    Notes Receivable*
    Other Long Term Receivables**
    Interest Receivable**
    Financing Receivables
    Related Party Receivables*
      Accounts Receivable - Related Party*
      Notes Receivable - Related Party*
    Due from Officers/Stockholders*
    Real Estate at Cost***
    Assets Held for Sale*
    Loans Held for Sale***
    Investments
      Investment in Non Consolidated Subsidiaries
      Investment in Affiliates
      Investment in Equity Securities
      Investment in Other(s)**
    Marketable Securities*
      Available for Sale*
      Held to Maturity*
      Trading Securities***
    Derivative Assets*
    Intangible Assets, Net
      Goodwill
      Other Intangible Assets, Net
        Intangible Assets
          Copyrights
          Trademarks, Brand Names
          Patents
          Franchise Rights
          Licenses
          Non Compete Agreements
          Customer Lists
          Computer Software
          Media Content
          Contractual Rights
          Trade Names
          Royalty
          Trade Secrets
          Other Intangible Assets
        Accumulated Amortization*
    Cash Surrender Value of Life Insurance
    Prepaid Expenses*
      Prepaid Pension Costs
      Other Prepaid Assets
    Pensions and OPEB***
    Deferred Long Term Asset Charges
      Deferred Financing Costs
      Deferred Income Taxes
    Assets of Discontinued Operations***
    Deferred Acquisition Costs***
    Restricted Cash*
    Accrued Rental(Income) Long Term**
    Program Rights***
    Reserves***
    Unearned Income***
    Real Estate Developments***
    Advances***

APPENDIX I-continued

- Prepublication Costs**
- Other Assets
- Total Capitalization and Liabilities**
- Liabilities and Stockholders' Equity
  - Liabilities
    - Current Liabilities
      - Accounts Payable and Accrued Expenses
        - Accounts Payable
          - Bank Overdrafts
          - Trade Accounts Payable
          - Other Accounts Payable
        - Accrued Expenses
          - Accrued Advertising
          - Accrued Insurance
          - Warranties and Related Accruals
          - Accrued Royalties
          - Other Accrued Expenses
          - Interest Payable
          - Taxes Other than Income Taxes Accrual
          - Dividends Payable*
          - Employee Related Liabilities
            - Salaries Accrual
            - Accrued Vacation
            - Accrued Bonuses
            - Employee Benefits Accrual
            - Other Employee Benefits Liabilities
        - Other Accounts Payable and Accrued Expenses**
      - Amounts Due to Affiliates
      - Amounts Due to Related Parties
        - Due to Officers/Stockholders*
        - Amounts Due to Related Parties and Others**
      - Liabilities of Discontinued Operations*
      - Billings in Excess of Cost
      - Deferred Income Taxes Liability
      - Liabilities Held for Sale***
      - Customer Advances or Deposits*
      - Accrued Taxes
      - Income Taxes Payable
      - Deferred (Unearned) Revenue*
      - Reserves***
      - Other Current Liabilities
      - Debt and Capital Lease Obligations
        - Current Portion of Long Term Debt
          - Secured*
          - Unsecured*
          - Line of Credit*
          - Subordinated Debt*
          - Convertible Debt***
          - Senior Debt***
          - Related Party Debt*
        - Notes and Loans*
          - Notes Payable*
          - Loans Payable
        - Capital Lease Obligations*
        - Commercial Paper
        - Other Short Term Borrowings
      - Derivative Liabilities - Short Term
      - Sales Tax Payable
    - Non Current Liabilities
      - Debt and Capital Lease Obligations
        - Long Term Debt
          - Secured*
          - Unsecured*
          - Line of Credit*
          - Subordinated Debt*
          - Convertible Debt*
          - Senior Debt***
          - Related Party Debt*
          - Other Long Term Debt
        - Notes and Loans*
          - Notes Payable*
          - Loans
        - Capital Lease Obligations*
        - Deferred Debt
          - Non Subordinated Deferred Debt
          - Subordinated Deferred Debt
        - Deferred Interest
      - Derivative Liabilities
      - Dividends Payable***
      - Liabilities Held for Sale***
      - Reserves***
      - Customer Advances or Deposits*
      - Pensions and OPEB*
        - Pension Obligations
        - Other Post-Retirement Obligations
      - Long Term Employee Benefits/Other Liabilities**
        - Deferred ESOP Benefits
        - Deferred Compensation*
        - Environmental Liability
        - Restructuring Reserve
        - Litigation Reserve
        - Commitments and Contingencies
        - Minority Interest*
        - Asset Retirement Obligation
        - Due to Officers/Stockholders*
        - Deferred Long Term Liability Charges
          - Deferred Income Tax Liabilities
          - Deferred (Unearned) Revenue*
        - Liabilities of Discontinued Operations***
        - Accrued Liabilities(Non Current)**
        - Accounts Payable(Non Current)**
        - Negative Goodwill**
        - Other Non Current Liabilities
    - Minority Interest***
    - Temporary Equity
      - Trust Preferred Securities
    - Redeemable Preferred Stock Obligations
    - Redeemable Common Stock
    - Warrants and Rights Outstanding*
  - Stockholders' Equity
    - Common Stock*
      - Common Stock Description
      - Common Stock*
      - Common Stock, Par Value Per Share
      - Share Subscriptions*
      - Shares Authorized*
      - Shares Issued*
      - Shares Outstanding*
    - Preferred Stock*
      - Preferred Stock Description
      - Preferred Stock*
      - Preferred Stock, Par Value Per Share
      - Share Subscriptions*
      - Shares Authorized*
      - Shares Issued*
      - Shares Outstanding*
    - Convertible Preferred Stock*
      - Convertible Preferred Stock Description
      - Convertible Preferred Stock*
      - Convertible Preferred Stock, Par Value Per Share
      - Share Subscriptions*
      - Shares Authorized*
      - Shares Issued*
      - Shares Outstanding*
    - Redeemable Preferred Stock*
      - Redeemable Preferred Stock Description
      - Redeemable Preferred Stock*
      - Redeemable Preferred Stock, Par Value Per Share
      - Share Subscriptions*
      - Shares Authorized*
      - Shares Issued*
      - Shares Outstanding*
    - Non Redeemable Preferred Stock*
      - Non Redeemable Preferred Stock Description
      - Non Redeemable Preferred Stock*
      - Non Redeemable Preferred Stock, Par Value Per Share
      - Share Subscriptions*
      - Shares Authorized*
      - Shares Issued*
      - Shares Outstanding*
    - Redeemable Convertible Preferred Stock*
      - Redeemable Convertible Preferred Stock Description
      - Redeemable Convertible Preferred Stock*
      - Redeemable Convertible Preferred Stock, Par Value Per Share
      - Share Subscriptions*
      - Shares Authorized*
      - Shares Issued*
      - Shares Outstanding*

APPENDIX I-continued

Non Redeemable Convertible Preferred Stock*
  Non Redeemable Convertible Preferred Stock Description
  Non Redeemable Convertible Preferred Stock*
  Non Redeemable Convertible Preferred Stock, Per
  Value Per Share
  Share Subscriptions*
  Shares Authorized*
  Shares Issued*
  Shares Outstanding*
Limited Partners**
  Capital Contributions***
  Interest in Partnership Net Income***
  Capital Transfers from the General Partners**
  Distributions***
  Other (Limited Partners)**
General Partners**
  Capital Contributions***
  Interest in Partnership Net Income***
  Capital Transfers to Limited Partners**
  Distributions***
  Other (General Partners)**
Contributed Capital**
Additional Paid in Capital
Warrants and Rights Outstanding*
Preferred Stock and Other Dividend**
Notes Other Receivables from ShareHolders**
Retained Earnings
  Retained Earnings - Appropriated
  Retained Earnings - Nonappropriated
Treasury Stock
  Treasury Stock Description
  Treasury Stock Value
  Treasury Stock - Number of Shares
Accumulated Comprehensive Income
  Cumulative Effect from a Change in Accounting Principle, Net
    Cumulative Effect from a Change in Accounting Principle
    Tax Effect of Cumulative Effect in Accounting Principle
  Minimum Pension Liability
  Cumulative Translation Adjustment
  Deferred Hedging Gain/Loss
  Unearned Compensation
    Deferred Compensation on Restricted Stock
    Other Unearned Compensation**
  Unrealized Gain/Loss on Marketable Securities
    Unrealized Gains/Losses on Available for Sale Securities
    Unrealized Gains/Losses on Trading Securities
  Other Accumulated Comprehensive Income
Restricted Stock**
Deferred Compensation***
Unearned ESOP Shares**
Shares in Trust**
Other Datapoints, Hierarchy - Income Statement (Commercial)

Operating Revenue
  Sales Revenue, Net
    Sales Revenue, Gross
      Goods
      Services
    Sales Returns and Allowances
      Sales Returns
      Sales Allowances
    Sales Discounts
  Revenue from Affiliates
  Royalty Revenue**
  Finance Revenue
  Other Operating Revenue
Cost of Goods and Services Sold
  Cost of Goods Sold
    Direct Materials*
    Direct Labor*
    Overhead*
    Depreciation*
    Other*
  Cost of Services
    Direct Materials*
    Direct Labor*
    Overhead*
    Depreciation*
    Other*
Gross Profit
Operating Expenses
  Selling General and Administrative Expenses
    Selling and Marketing Expenses
      Marketing and Advertising Expenses
      Selling Expenses
      Marketing and Business Development Expenses**
    General and Administrative Expenses
      Travel and Entertainment Expense
      Lease and Rental Expense
      Labor and Related Expenses
        Salaries and Wages
        Officers' Compensation
        Post-Retirement Benefit Expense
        Other Labor and Related Expenses
        Pension and Other Employee Benefit Expense
        Consulting and Professional Fee**.
      Other General and Administrative Expenses
  Research and Development Expense
  Professional Services**
  Real Estate Owned Holding Expense**
  Provision for Doubtful Accounts
  Taxes Other than Income Taxes
  Restructuring Charges
    Business Exit Costs
  Environmental Remediation
  Merger and Acquisitions Costs
  Depreciation and Amortization
    Depreciation
    Amortization
      Amortization - Intangibles
      Amortization - Acquisition Costs
  Impairment of Long Lived Assets and Certain Intangibles
  Impairment of Goodwill
  Royalty Expense
  Pre-Opening Costs
  Litigation Expense
  Property Expenses**
  Other Operating Expense
Equity in Income(Loss) from Affiliates/Other**
Operating Income (Loss)
Non Operating Income(Expense)
  Interest Income(Expense), Net
    Interest Expense
    Deferred Interest Expense
    Interest Income
  Financing Interest Expense
  Realized Gains (Losses) on Sale of Investments
  Gain (Loss) on Disposition of Assets
  Gain (Loss) on Sale of Business
  Gain (Loss) Related to Litigation Settlement
  Gain on Settlement of Pension Obligation
  Foreign Currency Exchange Gains(Losses)
  Gain on Settlement of Debt**
  Debt Related Commitment Fees
  Royalty Income
  Rental Income
  Dividend Income
  Other Non Operating Income (Expense)
    Other Non Operating Income
    Other Non Operating Expense
Income(Loss) from Continuing Operations Before Income Taxes
Provision for Income Taxes
  Current Income Tax Expense(Benefit)
    Current Federal Tax
    Current State and Local Taxes
    Current Foreign Tax
    Current Other Tax
  Deferred Income Tax Expense (Benefit)
    Deferred Federal Tax
    Deferred State and Local Tax
    Deferred Foreign Tax
    Deferred Other Tax
Income (Loss) from Continuing Operations*
Income(Loss) from Continuing Operations Before Minority Interest(Expense)**
Minority Interest, Net of Tax Effect APPENDIX I-continued Income(Loss) from Continuing Operations Before Equity in Earnings of Affiliate **
Earnings (Losses) from Equity Investments
Income Before Discontinued Operations**
Income(Loss) from Discontinued Operations, Net of Tax Effect
    Income(Loss) from Discontinued Operations
        Tax Effect of Income(Loss) from Discontinued Operations
    Income(Loss) from Disposition of Discontinued Operations*
        Income(Loss) During the Phase Out Period
        Tax Effect on the Income(Loss) from Disposition of Discontinued Operations
    Provision for Disposal of Discontinued Operations
Income Before Extraordinary Items and Cumulative Effect of Change in Accounting Principle*
Extraordinary Items, Net of Tax Effect
    Extraordinary Items, Gross
        Extinguishment of Debt
        Gain(Loss) from Adjustments
        Other Extraordinary Gain(Loss)
    Tax Effect of Extraordinary Items
    Other Nonrecurring Charges
Income Before Cumulative Effect of Change in Accounting Principle*
Cumulative Effect of Change in Accounting Principle, Net of Tax Effect*
    Effect of Changes in Accounting Principle
    Tax Effect of Change in Accounting Principle
Net Income
    Limited Partner Net Income**
    General Partner Net Income**
Comprehensive Income(Loss)**
    Other Comprehensive Income(Loss)**
    Unrealized Gain(Losses) from Securities/Other**
Accumulated Deficit Beginning**
Accumulated Adjustments**
Accumulated Deficit Ending**
Preferred Stock Dividends and Other Adjustments
    Preferred Stock Dividends
    General Partner Distributions
    Pro-Forma Adjustment
    Other Adjustments
Net Income Applicable to Common Stockholders
Basic Earnings Per Share
    Income(Loss) from Continuing Operations*
    Income(Loss) from Disposition of Discontinued Operations*
    Income Before Extraordinary Items and Cumulative Effect of Change in Accounting Principle*
    Income(Loss) from Extraordinary Items, Net of Tax Effect*
    Income Before Cumulative Effect of Change in Accounting Principle*
    Cumulative Effect of Change in Accounting Principle, Net of Tax Effect*
Weighted Average Number of Shares Outstanding
Diluted Earnings Per Share
    Income(Loss) from Continuing Operations*
    Income(Loss) from Disposition of Discontinued Operations*
    Income Before Extraordinary Items and Cumulative Effect of Change in Accounting Principle*
    Income(Loss) from Extraordinary Items, Net of Tax Effect*
    Income Before Cumulative Effect of Change in Accounting Principle*
    Cumulative Effect of Change in Accounting Principle, Net of Tax Effect*
Weighted Average Number of Diluted Shares Outstanding
Basic and Diluted Earnings Per Share**
    Income(Loss) from Continuing Operations***
    Income(Loss) from Disposition of Discontinued Operations***
    Income Before Extraordinary Items and Cumulative Effect of Change in Accounting Principle***
    Income(Loss) from Extraordinary Items, Net of Tax Effect***
    Income Before Cumulative Effect of Change in Accounting Principle***
    Cumulative Effect of Change in Accounting Principle, Net of Tax Effect***
Weighted Average Number of Basic and Diluted Shares Outstanding**
Dividends paid**
Dividends paid per share**

Datapoints Hierarchy - Cash Flow (Commercial)

Net Cash Flows Provided By (Used In) Operating Activities (Indirect)
    Net Income (Loss)
    Adjustments to Reconcile Net Income (Loss) to Net Cash Provided By (Used In) Operations
        Income (Loss) from Discontinued Operations
        Extraordinary Gain (Loss)
        Restructuring Charges
        Business Exit Costs
        Cumulative Effect of Change in Accounting Principle
        Cash Payments for Restructuring
        Minority Interest*
        Depreciation and Amortization
            Depreciation
            Amortization
                Amortization - Intangibles
                Amortization - Acquisition Costs
            Amortization of Deferred Loan Fees/Cost**
        Write Off of Acquired In-Process Research and Development
        Asset Impairment Charge
        Loss on Retirement of Property, Plant and Equipment
        Provision for Doubtful Accounts
        Realized Gains (Losses) on Sale of Investments
        Gains (Losses) on Sale of Securities and other Investments
        Gain (Loss) on Sale of Business
        Purchase of Mortgage loans held for sale***
        Proceeds from sale of mortgage loans held for sale***
        Undistributed Earnings of Affiliates
        Deferred Income Taxes
        Deferred Compensation***
        Exchange Gains (Losses)
        Origination of Loans for(Sale/Repayment/Real Estate)***
        ESOP and Restricted Stock Expense
        Payment of Financing Fees***
        Deferred Acquisition Costs**
        Other Adjustments
        Non Cash Expenses
        Interest Rate Swap Cost***
        Expenses Related to Sale(Other)***
        Non-Cash Acquisition***
        Change in Restricted Cash***
        Tax Benefit from the Excercise of Stock Options
        Change in Working Capital
            Change In Assets
                Change in Receivables
                Changes in Related Party Receivables
                    Changes in Related Party Accounts Receivable
                    Changes in Related Party Notes Receivable
                Increase in Finance Receivables
                Change in Inventories
                Change in Marketable Securities**
                Change in Mortgage Loans***
                Change in Other Current Assets
                Changes in Deposits
                Change in Other Assets
            Change in Liabilities
                Change in Accounts Payable and Accrued Expenses
                    Change in Accounts Payable
                    Change in Accrued Expenses
                Deferred Revenue
                Change in Income Taxes Payable
                Change in Interest Payable, Net*
                Change in Employee Related Liabilities
                Change in Prepaid Pension Costs
                Change in Other Current Liabilities
                Change in Other Liabilities
            Other Changes, Net
        Deferred Charges and Others***
        Cash Used for Discontinued Operations***
        Unrealized Gain/(Loss) on Securities
Net Cash Flows Provided By (Used In) Operating Activities (Direct)
    Cash From Sale of Goods and Services
    Interest and Dividends on Loans to, Other Debt of, and Equity of Other Entities
        Interest Received
        Dividends Received
        Other Cash Receipts
    Cash Paid to Employees and Suppliers
        Payments for Materials and Goods for Manufacture or Resale
        Payments for Other Goods and Services
    Taxes
    Interest paid

APPENDIX I-continued

Other Cash Payments
Net Cash Flows Provided By (Used In) Investing Activities
    Capital Additions, Net
        Purchase of Property, Plant and Equipment
    Purchases and Payments for Investments
        Purchase of Investments
            Purchase of Marketable Securities
            Unconsolidated Affiliates*
            Consolidated Subsidiaries*
        Other Investments
        Purchase of Certificate of Deposit**
        Purchase of Held-to-Maturity Investments
        Purchase of Available for Sale Investments
        Purchase of Mortgage loans held for sale***
    Life Insurance Policies*
    Notes Receivable*
    Software Development Costs
    Other Assets
    Cash Inflow from merger(acquisition)**
    Origination of Loans for(Sale/Repayment/Real Estate)***
    Proceeds from Sale of Property Plant and Equipment
    Acquisition and Divestiture of Business Activities, Net
        Acquisition of Businesses, Net of Cash Acquired
        Divesture of Businesses
        Acquisition of Capital Assets***
    Disposal of Investments
        Debt and Equity Securities
        Unconsolidated Affiliates*
        Consolidated Subsidiaries*
        Sale of Other Investments
        Redemption of Certificate of deposit**
        Proceeds from Available for Sale Investments
        Proceeds From Held-to-Maturity Investments
        Proceeds from sale of mortgage loans held for sale***
    Change in Short Term Investments, Net
        Proceeds from Sale of Short Term Investments, Net
        Purchase of Short Term Investments, Net
    Life Insurance Policies*
    Repayments of Notes Receivable
    Proceeds from the Sale of Other Assets
    Interest Rate Swap Cost***
    Expenses Related to Sale(Other)***
    Payment of Financing Fees***
    Proceeds from Loans from(Bank/ShareHolder/Affiliates)***
    Proceeds from Loans Payable**
    Repayment of Loans**
    Net Change in Lease Payment/Others Receivables**
    Additional Paid In Capital***
    Deferred Charges and Others***
    Deferred Compensation***
    Change in Restricted Cash***
    Change in Mortgage Loans***
    Other Investing Activities, Net
        Change in Other Assets, Net
        Change in Other Liabilities,Net**
    Cash Used for Discontinued Operations***
Net Cash Flows Provided By (Used In) Financing Activities
    Net Change in Debt
        Change in Short Term Borrowings
            Change in Bank Overdrafts, Net
            Proceeds from Short Term Borrowings
                Line of Credit*
                Capital Lease Obligations***
                Subordinated Debt*
                Notes Payable*
                Proceeds from Loans from(Bank/ShareHolder/Affiliates)***
                Other Debt*
            Repayments of Short Term Borrowings
                Line of Credit*
                Capital Lease Obligations*
                Subordinated Debt***
                Notes Payable*
                Other Debt*
            Repayment of Loans (Bank/ShareHolder/Affiliates)**
    Net Change in Long Term Debt and Capital Securities
        Proceeds from the Issuance of Long Term Debt and Capital Securities
            Proceeds from the Issuance of Company Obligated Mandatorily Redeemable Capital Securities
            Proceeds from the Issuance of Other Long Term Debt
        Repayments of Long Term Debt and Capital Securities
            Repayments of Company Obligated Mandatorily Redeemable Capital Securities
            Repayments of Other Long Term Debt
    Net Change in Equity
        Proceeds from Issuance of Equity
            Common Stock*
            Proceeds From Issuance of Treasury Stock
            Preferred Stock*
            Stock Options Exercised
            Net Proceeds from Stock Plans
            Issuance of Warrants
            Sale of Interest in a Subsidiary
            Other*
        Payment for Repurchases of Equity
            Repurchase of Preferred and Common Stock
                Common Stock*
                Preferred Stock*
            Minority Interest*
            Repurchase of Treasury Stock**
            Other*
        Preferred Stock Transactions, Net
        Common Stock Transactions, Net
        Treasury Stock Transactions, Net**
        Change in Interest Payable, Net***
        Interest Rate Swap Cost***
        Acquisition of Capital Assets***
        Expenses Related to Sale(Other)***
        Notes Receivable***
        Payment of Financing Fees***
        Merger Related Expenses
        Payment of Dividends
            Dividends on Common and Preferred Stock
                Common Dividends
                Preferred Dividends
            Minority Interest Dividends
        Other Cash Provided By (Used In) Financing Activities
        Change in Restricted Cash***
        Additional Paid In Capital***
        Deferred Charges and Others***
        Deferred Compensation***
        Cash Used for Discontinued Operations***
Effect of Exchange Rate on Cash and Cash Equivalents
Net Increase (Decrease) in Cash and Cash Equivalents
Beginning of Period Cash and Cash Equivalents
Cash and Cash Equivalents at the End of the Year
Supplemental Disclosure
    Cash Interest Expense
    Income Taxes Paid
    Interest Rate Swap Cost***
    Deferred Compensation***
    Acquisition of Capital Assets***
    Non Cash Investing and Financing Activities
        Conversion of Debt Securities
        Dividends Declared but not Paid
        Non-Cash Acquisition***
        Other Noncash Investing and Financing Activities**
        Origination of Loans for(Sale/Repayment/Real Estate)***
        Treasury Stock Transactions, Net***
        Capital Lease Obligations***
        Notes Receivable***
        Change in Restricted Cash***
        Additional Paid In Capital***
        Fair Value of Assets Acquired
        Purchase of Mortgage loans held for sale***
Stock Issued
Exchange of Assets**
Liabilities Assumed

---

Datapoints Hierarchy - Balance Sheet (Banking/Savings)

Assets
    Cash and Cash Equivalents
        Cash and Due from Banks
        Interest Bearing Deposits in Banks
        Federal Funds Sold and Securities Purchased Under Agreements to Resell
            Federal Funds Sold

APPENDIX I-continued

Securities Purchased Under Agreements to Resell
Marketable Securities
  Trading Securities
    Trading Securities - Encumbered
    Trading Securities - Unencumbered
  Available for Sale
    Encumbered *
    Unencumbered *
    US Treasury and Other US Government Corporations and Agencies *
    States Within US and Political Subdivisions of States*
    Debt Securities Issued by Foreign Governments *
    Corporate Debt Securities *
    Mortgage Backed Securities *
    Other Debt Securities *
    Equity Securities
    Accounts Receivable from Securitizations
    Other Investments
  Held to Maturity
    Encumbered *
    Unencumbered*
    US Treasury and Other US Government Corporations and Agencies*
    States Within US and Political Subdivisions of States*
    Debt Securities Issued by Foreign Governments*
    Corporate Debt Securities*
    Mortgage Backed Securities*
    Other Debt Securities*
Federal Home Loan Bank Stock at Cost
NCUSIF Deposit
Net Loans
  Loans Held for Sale
    Mortgages Held for Sale
  Net Loans Held in Portfolio
    Loans Recievable**
    Allowance for Loan Losses
    Loans Held in Portfolio
      Unearned Income
      Construction Loans
      Residential Real Estate Loans
      Commercial Real Estate
      Commercial, Industrial and Agricultural Loans
      Trade Financing
      Consumer Loans
      Foreign
      Lease Financing
      Other Loans
Customers' Acceptance Liability
Other Interest Earning Assets
Net Foreclosed Assets
  Real Estate Acquired in Settlement of Loans
Investments in Real Estate and Joint Ventures
  ADC Arrangements Accounted for as Investments
Property, Plant and Equipment, Net
  Accumulated Depreciation and Amortization
    Accumulated Depreciation
    Accumulated Amortization, Capital Leased Assets
    Accumulated Amortization of Computer Software Costs
  Property, Plant and Equipment
    Land, Buildings and Improvements
    Land and Land Improvements
      Land
      Land Improvements
    Buildings
  Furniture and Fixtures
  Office and Computer Equipment
  Vehicles
  Construction in Progress
  Leasehold Improvements
  Capital Leased Assets, Net
    Capital Leased Assets
  Computer Software Costs**
  Internal Use Computer Software
  Other Property, Plant and Equipment
Intangible Assets, Net
  Goodwill
  Other Intangible Assets, Net
    Intangible Assets
      Copyrights
      Trademarks, Brand Names
      Patents
      Franchise Rights
      Non Compete Agreements
      Customer Lists
      Computer Software
      Trade Names
      Royalty
      Trade Secrets
      Other Intangible Assets
      Core Deposit Intangible
      Mortgage Servicing Rights
    Accumulated Amortization
Accounts Receivable - Related Party
Notes Receivable - Related Party
Income Taxes Receivable, Net
Finance Receivables, Net**
  Financing Receivables
  Allowance for Finance**
Notes Receivable, Net
Due from Officers/Stockholders
Other Receivables, Net
Cash Surrender Value of Life Insurance
Short Term Investments
Investments
  Investment in Non Consolidated Subsidiaries
  Investment in Affiliates
  Investment in Equity Securities
Prepaid Expenses
  Prepaid Insurance
  Other Prepaid Expenses
Prepaid Pension Costs
Other Prepaid Assets
Accrued Interest
Accrued Income
Deferred Long Term Asset Charges
  Deferred Financing Costs
Deferred Tax Asset
Derivative Assets
Assets Held for Sale
Assets of Discontinued Operations**
Other Assets

Liabilities and Stockholders' Equity

Liabilities
  Total Deposits
    Demand Deposit Accounts
      Demand Deposit Accounts - Non Interest Bearing
      Demand Deposit Accounts - Interest Bearing
    Savings Deposits
    Money Market Deposits
    Time Deposits
      Foreign Time Deposits
      Time Deposits Over $100,000
      Time Deposits Less than $100,000
    Retail Deposits
    Wholesale Deposits
  Total Deposits By Foreign/Domestic
    Total Foreign Deposits
      Foreign Interest Bearing Deposits*
      Foreign Non Interest Bearing Deposits*
    Total Domestic Deposits
      Domestic Interest Bearing Deposits*
      Domestic Non Interest Bearing Deposits*
  Total Deposits by Interest Bearing/Non Interest Bearing
    Interest Bearing Deposits
      Domestic Interest Bearing Deposits*
      Foreign Interest Bearing Deposits*
    Non Interest Bearing Deposits
      Domestic Non Interest Bearing Deposits*
      Foreign Non Interest Bearing Deposits*
  Federal Funds Puchased and Securities Sold Under Agreements to Repurchase
    Federal Funds Puchased
    Securities Sold Under Agreements to Repurchase
  Bank Acceptances Executed and Outstanding
  Short Term Borrowings
    Commercial Paper

APPENDIX I-continued

Other Short Term Borrowings
Company Obligated Manditorily Redeemable Preferred Capital
  Securities of Subsidiary Trusts
Advances from Federal Home Loan Banks
Accounts Payable and Accrued Expenses
  Accounts Payable
    Bank Overdrafts
    Other Accounts Payable
  Accrued Expenses
    Accrued Advertising
    Accrued Insurance
    Accrued Royalties
    Other Accrued Expenses
    Interest Payable
    Taxes Other than Income Taxes Accrual
    Dividends Payable
    Employee Related Liabilities
      Salaries Accrual
      Accrued Vacation
      Accrued Bonuses
      Employee Benefits Accrual
      Other Employee Benefits Liabilities
  Amounts Due to Affiliates
  Trading Liabilities
  Due to Officers/Stockholders
  Accrued Liabilities**
  Accrued Taxes
  Income Taxes Payable
  Sales Tax Payable
  Debt and Capital Lease Obligations
    Deferred Debt
      Non-Subordinate Deferred Debt
      Subordinate Deferred Debt
    Deferred Interest
    Capital Lease Obligations
    Loans Payable**
    Medium Term Notes
    Related Party Debt**
    Long-Term Debt
  Derivative Liabilities
  Pensions and OPEB
    Pension Obligations
    Other Post-Retirement Obligations
  Deferred ESOP Benefits
  Deferred Compensation*
  Deferred Long Term Liability Charges
    Deferred Income Tax Liabilities
    Deferred (Unearned) Revenue
  Environmental Liability
  Restructuring Reserve
  Litigation Reserve
  Commitments and Contingencies
  Minority Interest*
  Asset Retirement Obligation
  Negative Goodwill**
  Liabilities of Discontinued Operations**
  Other Liabilities
Stockholders' Equity
  Common Stock*
    Common Stock Description
    Common Stock*
    Common Stock, Par Value Per Share
    Share Subscriptions*
    Shares Authorized*
    Shares Issued*
    Shares Outstanding*
  Preferred Stock*
    Preferred Stock Description
    Preferred Stock*
    Preferred Stock, Par Value Per Share
    Share Subscriptions*
    Shares Authorized*
    Shares Issued*
    Shares Outstanding*
  Convertible Preferred Stock*
    Convertible Preferred Stock Description
    Convertible Preferred Stock*
    Convertible Preferred Stock, Par Value Per Share
    Share Subscriptions*
    Shares Authorized*
    Shares Issued*
    Shares Outstanding*
  Redeemable Preferred Stock*
    Redeemable Preferred Stock Description
    Redeemable Preferred Stock*
    Redeemable Preferred Stock, Par Value Per Share
    Share Subscriptions*
    Shares Authorized*
    Shares Issued*
    Shares Outstanding*
  Non-Redeemable Preferred Stock*
    Non Redeemable Preferred Stock Description
    Non Redeemable Preferred Stock*
    Non Redeemable Preferred Stock, Par Value Per Share
    Share Subscriptions*
    Shares Authorized*
    Shares Issued*
    Shares Outstanding*
  Redeemable Convertible Preferred Stock*
    Redeemable Preferred Stock Description
    Redeemable Preferred Stock*
    Redeemable Preferred Stock, Par Value Per Share
    Share Subscriptions*
    Shares Authorized*
    Shares Issued*
    Shares Outstanding*
  Non Redeemable Convertible Preferred Stock*
    Non Redeemable Preferred Stock Description
    Non Redeemable Preferred Stock*
    Non Redeemable Preferred Stock, Par Value Per Share
    Share Subscriptions*
    Shares Authorized*
    Shares Issued*
    Shares Outstanding*
  Warrants and Rights Outstanding*
  Retained Earnings
    Retained Earnings - Appropriated
    Retained Earnings - Nonappropriated
  Treasury Stock
    Treasury Stock Description
    Treasury Stock Value
    Treasury Stock-Number of Shares
  Accumulated Comprehensive Income
    Cumulative Effect from a Change in Accounting Principle, Net
      Cumulative Effect from a Change in Accounting Principle
      Tax Effect of Cumulative Effect in Accounting Principle
    Minimum Pension Liability
    Cumulative Translation Adjustment
    Deferred Hedging Gain/Loss
    Unearned Compensation
      Deferred Compensation on Restricted Stock
      Other Unearned Compensation**
    Unrealized Gain/Loss on Marketable Securities
      Unrealized Gains/Losses on Available for Sale Securities
      Unrealized Gains/Losses on Trading Securities
      Unrealized Gains/Losses on Held to Maturity/Fixed Maturity
        Securities**
    Other Accumulated Comprehensive Income
  Restricted Stock**
  Shares in Trust**
  Deferred Compensation*
  Unearned ESOP Shares**
  Other
Minority Interest***
Temporary Equity
  Trust Preferred Securities
Redeemable Preferred Stock Obligations
Redeemable Common Stock
Warrants and Rights Outstanding*

---

Datapoints Hierarchy - Income Statement (Banking/Savings)

Total Interest Income
  Loans and Leases
    Interest on Loans Held for Investment and Leases
      Interest on Loans Held for Investment
      Interest on Leases
    Interest on Loans Held for Sale

APPENDIX I-continued

Available for Sale Securities
Held to Maturity Securities
Trading Assets
Federal Funds Sold and Securities Purchased Under Agreements to
   Resell Federal Funds Sold
   Securities Purchased Under Agreements to Resell
Interest on Deposits with Financial Institutions
   Deposits with Domestic Offices
      Interest on Money Market Deposits
      Interest on Other Domestic Deposits
   Interest on Deposits with Foreign Offices
   Investment Income **
      Dividend Income **
      Interest on Mortgage Loan**
      Income from Real Estate/Rent/Properties**
      Securities Lending**
      Other Investment Income**
   Other Interest Income
   Interest Income from Securities
      Interest Income from Securities Subject to Federal Income Tax
      Interest Income from Securities Exempt from Federal Income Taxes
Total Interest Expense
   Deposits
      Domestic Deposits
         NOW, Money Market Accounts, and Savings Deposits
         Time Deposits
         Time Deposits $100,000 or more
         Other Domestic Deposits
      Foreign Deposits
   Federal Funds Purchased and Securities Sold Under Agreements to
      Repurchased Federal Funds Purchased
      Securities Sold Under Agreements to Repurchased
   Borrowings
      Short Term Borrowings
         Federal Home Loan Bank and Federal Reserve Bank Advances*
         Commercial Paper
         Other Short Term Borrowings
      Long Term Borrowings</B<td>
         Federal Home Loan Bank and Federal Reserve Bank Advances*
         Other Long Term Borrowings
   Long-Term Debt and Capital Securities
      Long Term Debt
         Subordinated Notes and Debentures
         Other Long Term Debt
         Medium Term Notes
      Capital Securities
   Other Interest Expense
Net Interest Income
Provision for Loan and Lease Losses
Net Interest Income After Provision for Loan and Lease Losses
Total Non Interest Income
   Fees and Commissions Income
      Service Charges on Deposit Amounts
      Fiduciary and Trust Fees
      Investment banking, advisory, brokerage, and underwriting fees and commissions
      Mortgage Banking Fees
      Net Servicing Fees
      Insurance Commissions and Fees
      Credit Card Fees
      Other Fees and Commissions
   Gains (Losses) on Sale of Assets
      Net Gain (Losses) on Sale of Securities
      Net Gain (Losses) on Sales of Loans
      Gains(Losses) on Sale of Business**
      Net Securitization Gains (Losses)
      Gains (Losses) on Sale of Credit Card Portfolio
      Gains (Losses) on Sale of Other Real Estate
      Gains (Losses) on Sale of Other Assets
   Trading Revenue
      Foreign Exchange Trading Gains and Losses
   Total Other Non Interest Income
      Net Venture Capital (Losses) Gains
      Bank Owned Life Insurance Income
      Other Non Interest Income
         Equity in Earnings in Unconsolidated Subsidiaries
         Non Interest Income - Profit/Loss from Real Estate Operations
         Non Interest Income - Profit/Loss on Foreign Investment Total Non Interest Expense
   Compensation and Employee Benefits
   Net Occupancy
   Furniture and Equipment
   Communications and Data Processing
   Impairment of Goodwill
   Impairment of Long Lived Assets and Certain Intangibles**
   Depriciation and Amortization
   Restructuring Charges
   Pre-Opening Costs
   Selling and Marketing
   General and Administrative Expense**
      Travel and Entertainment Expense**
      Lease and Rental Expense**
      Bank Charges**
      Professional, Legal and Other Fees**
      Other General and Administrative Expenses**
   Other Non Interest Expense
Income(Loss) from Continuing Operations Before Income Taxes
Provision for Income Taxes
   Current Income Tax Expense (Benefit)
      Current Federal Tax
      Current State and Local Tax
      Current Foreign Tax
      Current Other Tax
   Deferred Income Tax Expense (Benefit)
      Deferred Federal Tax
      Deferred State and Local Tax
      Deferred Foreign Tax
      Deferred Other Tax
Income (Loss) from Continuing Operations *
Income(Loss) from Continuing Operations Before Minority Interest(Expense)**
Minority Interest, Net of Tax Effect
Income(Loss) from Continuing Operations Before Equity in Earnings of Affiliate**
Earnings (Losses) from Equity Investments
Income Before Discontinued Operations**
Income (Loss) from Discontinued Operations, Net of Tax Effect
   Income (Loss) from Discontinued Operations
   Tax Effect of Income (Loss) from Discontinued Operations
   Income (Loss) from Disposition of Discontinued Operations *
      Income (Loss) During Phase Out Period
      Tax Effect on Income (Loss) from Disposition of Discontinued Operations
      Provision for Disposal of Discontinued Operations
Income Before Extraordinary Items and Cumulative Effect of Change in Accounting Principle*
Extraordinary Items, Net of Tax Effect
   Extraordinary Items, Gross
      Extinguishment of Debt
      Gain (Loss) from Adjustments
      Other Extraordinary Gain (Loss)
   Tax Effect of Extraordinary Items
   Other Nonrecurring Charges
Income Before Cumulative Effect of Change in Accounting Principle *
Cumulative Effect of Change in Accounting Principle, Net of Tax Effect *
   Effect of Changes in Accounting Principle
   Tax Effect of Change in Accounting Principle
Net Income
Preferred Stock Dividends and Other Adjustments
Net Income Applicable to Common Stockholders
Accumulated Deficit at the beginning of the year**
Accumulated Deficit adjustments**
Accumulated Deficit at the end of the year**
Comprehensive Income(Loss)**
   Reclassification Adjustment for Gain(Losses) **
   Realized and Unrealized Gain(Losses) from Securities/Other**
   Other Comprehensive Income(Loss) **
Basic Earnings Per Share
   Income (Loss) from Continuing Operations *
   Income (Loss) from Disposition of Discontinued Operations *
   Income Before Extraordinary Items and Cumulative Effect of Change in Accounting Principle *
   Income (Loss) from Extraordinary Items, Net of Tax Effect *
   Income Before Cumulative Effect of Change in Accounting Principle *
   Cumulative Effect of Change in Accounting Principle, Net of APPENDIX I-continued Tax Effect*
Tax Effect*
Weighted Average Number of Shares Outstanding
Diluted Earnings Per Share
  Income (Loss) from Continuing Operations*
  Income (Loss) from Disposition of Discontinued Operations *
  Income Before Extraordinary Items and Cumulative Effect of
  Change in Accounting Principle*
  Income (Loss) from Extraordinary Items, Net of Tax Effect *
  Income Before Cumulative Effect of Change in Accounting
  Principle*
  Cumulative Effect of Change in Accounting Principle, Net of
  Tax Effect*
Weighted Average Number of Diluted Shares Outstanding
Basic and Diluted Earnings Per Share**
  Income(Loss) from Continuing Operations ***
  Income(Loss) from Disposition of Discontinued Operations***
  Income Before Extraordinary Items and Cumulative Effect of
  Change in Accounting Principle***
  Income(Loss) from Extraordinary Items, Net of Tax Effect***
  Income Before Cumulative Effect of Change in
  Accounting Principle***
  Cumulative Effect of Change in Accounting Principle, Net of
  Tax Effect***
Weighted Average Number of Basic and Diluted Shares
Outstanding**
Dividends paid**
Dividends paid per share**

Datapoints Hierarchy - Cash Flow (Banking/Savings)

Net Cash Flows Provided By (Used In) Operating Activities (Indirect)
Net Income (Loss)
Adjustments to Reconcile Net Income (Loss) to Net Cash Provided
By (Used In)
Operations
  Income (Loss) from Discontinued Operations
  Extraordinary Gain (Loss)
  Restructuring Charges
  Business Exit Costs
  Cumulative Effect of Change in Accounting Principle
  Cash Payments for Restructuring
  Minority Interest*
  Depreciation and Amortization
    Depreciation
    Amortization
  Write Off of Acquired In-Process Research and Development
  Asset Impairment Charge
  Loss on Retirement of Property, Plant and Equipment
  Provision for Doubtful Accounts
  Realized Gains (Losses) on Sale of Investments
  Gains (Losses) on Sale of Securities and other Investments
  Gain (Loss) on Sale of Business
  Undistributed Earnings of Affiliates
  Deferred Income Taxes
  Exchange Gains (Losses)
  ESOP and Restricted Stock Expense
  Other Adjustments
  Noncash Expenses
  Interest Rate Swap Cost***
  Expenses Related to Sale(Other)***
  Non-Cash Acquisition**
  Tax Benefit from the Excercise of Stock Options
  Change in Working Capital
    Change In Assets
      Increase in Finance Receivables
      Increase (Decrease) in Accounts Receivable Securitization
      Net Change in Trading Account Securities
      Net Change in Loans Held for Sale
      Net Change in Accrued Interest Income Receivable
      Net Change in Interest and Dividends Receivable
      Changes in Related Party Receivables
        Changes in Related Party Accounts Receivable
        Changes in Related Party Notes Receivable
    Change in Liabilities
      Change in Accounts Payable and Accrued Expenses
        Change in Accounts Payable
        Change in Accrued Expenses
      Deferred Revenue
      Change in Income Taxes Payable
      Change in Interest Payable, Net
      Change in Employee Related Liabilities
      Change in Prepaid Pension Costs
      Net Change in Undisbursed Loan Funds
      Net Change in Liability for Checks Issued
    Other Changes, Net
      Change in Other Assets
      Change in Other Liabilities
  Amortization of Deferred Loan Fees
  Net (Gains) Loss Realized on Sales of Loans
    Net Gain (Loss) Realized on Sales of Consumer Loans
    Net Gain (Loss) from Mortgage Loans
  Provision for Foreclosed Asset Losses
    Provision for Loan and Lease Losses
    Provision for Other Losses
      Provision for Other credit losses
  Net Gain (Loss) on Sales of MSR
  MSR (Impairment) Recovery
  Cash Payments from Acquisitions and Sales of Loans
  Proceeds from Sales of Loans Held for Sale
  Originations and Purchases of Loans Available for Sale, net
  Purchase of Residential Mortgage Loans
  Purchase and Originations of Mortgage Banking Assets
  Unrealized Gain/(Loss) on Securities
  Deferred Charges and Others***
  Deferred Compensation***
  Cash Used for Discontinued Operations***
Net Cash Flows Provided By (Used In) Operating Activities (Direct)
  Interest and Dividends on Loans to, Other Debt of, and Equity of
  Other Entities
    Interest Received
    Dividends Received
    Other Cash Receipts
  Cash Paid to Employees and Suppliers
    Payments for Other Goods and Services
    Taxes
    Interest paid
    Other Cash Payments
  Cash Receipts from Sales of Securities
  Cash Payments from Purchases of Securities
  Cash Receipts from Sale of Other Assets
  Cash Payments from Purchase of Other Assets
  Deposits with Other Institutions
  Withdrawals of Deposits
  Time Deposits Accepted
  Repayments of Deposits
  Loans Made to Customers
  Principal Collections of Loans
Net Cash Flows Provided By (Used In) Investing Activities
  Capital Additions, Net
    Purchase of Property, Plant and Equipment
  Purchases and Payments for Investments
    Purchase of Investments
      Purchase of Marketable Securities
      Unconsolidated Affiliates *
      Consolidated Subsidiaries *
      Other Investments
      Purchase of Certificate of Deposit **
      Purchase of Held-to-Maturity Investments
      Purchase of Available for Sale Investments
    Life Insurance Policies *
    Notes Receivable
    Other Assets
    Software Development Costs
  Proceeds from Sale of Property, Plant and Equipment
  Acquisition and Divestiture of Business Activities, Net
    Acquisition of Businesses, Net of Cash Acquired
    Acquisition of Capital Assets **
    Divesture of Businesses
  Disposal of Investments
    Debt and Equity Securities
    Unconsolidated Affiliates*
    Consolidated Subsidiaries*
    Sale of Other Investments
      Redemption of Certificate of deposit**
      Proceeds from Sales of Other Investments
      Proceeds from Prepayments and Maturities of Other Investments
    Proceeds from Available for Sale Investments

APPENDIX I-continued

Proceeds from Sales of Available for Sale Investments
    Proceeds from Maturities, Prepayments and Calls of Available
       for Sale Investments
  Proceeds from Held to Maturity Investments
    Proceeds from Sales of Held-to-Maturity Investments
    Proceeds from Maturities, Prepayments and Calls of Held-to-
      Maturity Investments
Change in Short Term Investments, Net
  Proceeds from Sale of Short Term Investments, Net
  Purchase of Short Term Investments, Net
Life Insurance Policies *
Repayments of Notes Receivable
Proceeds from the Sale of Other Assets
Other Investing Activities, Net
    Change in Other Assets, Net
Net Change in Interest Bearing Deposits in Banks
Net Change in Loans and Leases
  Net Loan Originations and Principal Collections
  Proceeds from Sales of Loans Held for Investment
    Proceeds from Securitizations of Loans
    Proceeds from Securitizations of Consumer Loans
    Proceeds from Securitizations of Credit Cards
  Purchase of Loans Receivable Held for Investment
    Purchase of Securitizations of Credit Cards
  Other Changes in Loans and Leases, Net
Proceeds from Sales of Foreclosed Assets
Proceeds from Sales of Other Real Estate
Proceeds from Sales of Wholly Owned Real Estate and Real Estate
Acquired in Settlement of Loans
Proceeds from Sales of Mortgage Backed Securites (MBS)
Purchase of Mortgage Backed Securities
Principal Payments on Loans Receivable Held for Investment
Investments in Real Estate Held for Investment
Recoveries of Loans Previously Charged Off
Purchase of Federal Home Loan Bank Stock
Sales of Federal Home Loan Bank Stock
Purchase of Federal Reserve Stock
Sales of Federal Reserve Stock
Purchases related to acquisition
Change in Mortgage Servicing Rights
  Increase in Mortgage Servicing Rights
  Decrease in Mortgage Servicing Rights
Net Change in Federal Funds Sold and Securities Purchased Under
Agreements to Resell
  Net Change in Federal Funds Sold
  Net Change in Securities Purchased Under Agreements to Resell
Deferred Charges and Others ***
Deferred Compensation ***
Cash Used for Discontinued Operations '
Interest Rate Swap Cost***
Expenses Related to Sale(Other)***
Net Cash Flows Provided By (Used In) Financing Activities
  Net Change in Debt
    Change in Short Term Borrowings
      Change in Bank Overdrafts, Net
      Proceeds from Short Term Borrowings
        Line of Credit*
        Capital Lease Obligations***
        Subordinated Debt*
        Notes Payable*
        Other Debt*
      Repayments of Short Term Borrowings
        Line of Credit*
        Capital Lease Obligations*
        Subordinated Debt***
        Notes Payable*
        Other Debt*
    Net Change in Federal Funds Purchased and Securities Sold Under
    Agreements to Repurchase
      Net Change in Federal Funds Purchased
      Net Change in Securities Sold Under Agreements to Repurchase
Net Change in Long Term Debt and Capital Securities
    Proceeds from the Issuance of Long Term Debt and Capital
    Securities
      Proceeds from Issuance of Medium Term Notes
      Issuances of Senior Notes
      Issuances of Subordinated Debt
      Proceeds from Federal Home Loan Bank Borrowings
      Proceeds from the Issuance of Company Obligated Mandatorily
      Redeemable Capital Securities
    Proceeds from the Issuance of Other Long Term Debt
  Repayments of Long Term Debt and Capital Securities
    Payments of Medium Term Notes
    Maturities of Senior Notes
    Maturities of Subordinated Debt
    Payments of Federal Home Loan Bank Borrowings
    Repayments of Company Obligated Mandatorily
    Redeemable Capital Securities
    Repayments of Other Long Term Debt
Net Change in Other borrowings
Net Change in Equity
  Proceeds from Issuance of Equity
    Common Stock*
    Proceeds from Issuance of Treasury Stock
    Preferred Stock*
    Stock Options Exercised
    Net Proceeds from Stock Plans
    Issuance of Warrants
    Sale of Interest in a Subsidiary
    Other*
  Payment for Repurchases of Equity
    Repurchase of Preferred and Common Stock
      Common Stock*
      Preferred Stock*
    Minority Interest*
      Repurchase of Treasury Stock**
      Other*
    Preferred Stock Transactions, Net
    Common Stock Transactions, Net
    Treasury Stock Transactions, Net**
  Merger Related Expenses
  Payment of Dividends
    Dividends on Common and Preferred Stock
      Common Dividends
      Preferred Dividends
    Minority Interest Dividends
  Net Change in Deposits
    Increase/Decrease in deposit balances
    Deposits Purchased/Sold
  Payment of Financing Fees**
  Deferred Charges and Others***
  Deferred Compensation ***
  Interest Rate Swap Cost***
  Expenses Related to Sale(Other)***
  Cash Used for Discontinued Operations***
  Other Cash Provided By (Used In) Financing Activities
Effect of Exchange Rate on Cash and Cash Equivalents
Net Increase (Decrease) in Cash and Cash Equivalents
Beginning of Period Cash and Cash Equivalents
Cash and Cash Equivalents at the End of the Year
Supplemental Disclosure
  Cash Interest Expense
  Income Taxes Paid
  Noncash Investing and Financing Activities
    Conversion of Debt Securities
    Dividends Declared but not Paid
    Other Noncash Investing and Financing Activities**
  Fair Value of Assets Acquired
  Stock Issued
  Liabilities Assumed Note:
*Repeated under Different Parents
**Enhancement to XBRL
***Sum of * and **

APPENDIX II

| Exemplary Standard (Enhanced XBRL) Terms | Exemplary Company-Specific Terms |
| --- | --- |
| Accounts Receivable Trade | Accounts and advances receivable Accounts receivable less unamortized Accounts receivable net |

APPENDIX II

| Exemplary Standard (Enhanced XBRL) Terms | Exemplary Company-Specific Terms |
|---|---|
| | Accounts receivable, trade, less allowances |
| | Affiliates and others |
| | Credit cardreceivables |
| | Customer sales and service |
| | Customer, less allowance |
| | Customers accounts |
| | Electric service, net |
| | Expenditures for future crops |
| | Fees from Franklin Templeton Group |
| | Gas operations |
| | Insurance claim received |
| | Joint interest participants, net of allowance of |
| | Loans receivable, secured by real |
| | Magazine operations |
| | Oil and gas purchasers |
| | Oil and gas revenues |
| | Real estate Construction and land |
| | Receivable from brokers |
| | Receivables, less rsrves |
| | Receivables, net of provisions for uncollectible |
| | Reinsurance premiums receivable |
| | Rightofway rental |
| | Technology license fees |
| | Trade accounts receivable, net notes |
| | Trade receivables net of allowances |
| | Trading Account Assets |
| | Underwriting premiums |
| | Utility Service |
| | Water disposal |
| | Wholesale receivables |
| Notes Receivable | Contract loans and notes receivable |
| | Convertible subordinated promissory note receivable |
| | Current Portion Convertible Note Receivable |
| | Current installments of mortgage notes receivable |
| | Demand note receivable for common stock |
| | Employee notes receivable and other noncurrent assets |
| | Finance companies notes receivable notes |
| | Installment notes receivable, trade |
| | LDA note receivable |
| | Less note and stock subscriptions receivable |
| | Lodging notes receivable |
| | Longterm accounts and notes receivable |
| | Merchant notes receivable |
| | Noncurrent notes receivable |
| | Noncurrent portions of notes receivable |
| | Note & Interest Receivable Officer |
| | Note Receivable Former Officer, Less Allowance |
| | Notes and amounts receivable from disposition |
| | Notes and contracts receivable and other, less allowance |
| | Notes and drafts receivable |
| | Note and accrued interest receivable shareholder |
| | Note and interest receivable from related party |
| | Note and loans receivable noncurrent |
| | Zero coupon mortgage notes receivable |
| Goodwill | Acquired above market lease intangibles net |
| | Acquired Goodwill |
| | Acquisition premium |
| | Amounts paid in excess of net assets of acquired businesses |
| | Assets acquired in excess of cost |
| | Assets to be sold primarily goodwill |
| | Capitalized R&D Goodwill |
| | Core deposit intangibles and goodwill |
| | Cost in excess |
| | Costs of businesses over net assets acquired |
| | Deferred charges goodwill, |
| | Deposit premium and goodwill, net |
| | Estimated goodwill, net |
| | Excess cost of investments in subsidiaries |
| | Excess reorganization value over the fair value of identifiable assets |
| | Franchise costs and other costs in |
| | Green World Goodwill, net of amortization |
| | Identifiable intangible assets and goodwill, net |
| | Intangible assets not subject to amortization Goodwill |
| | Investment technologies and goodwill |
| | Names and reputations |
| | Net goodwill and other acquired intangible assets |
| | Payment in excess of fair value for acquisition, net |
| | Permanent impairment of goodwill related to Loan |
| | Preliminary Snapple Goodwill and Other Intangibles |
| | Present value of future profits |
| | Purchase Cost in Excess of Assets Acquired |
| | Regulatory assets and goodwill |
| | Reorganization value in excess of amounts allocated to |
| | Retail operations, net of accumulated amortization |
| | Travel Source |
| Property, Plant and Equipment | Abandonment |
| | Accumdeprecdepland amortz gas plant |
| | Additions to Property, Plant & Equipment |
| | Advance on equipment |
| | Advertising structures |
| | Agency Acquisition, Net of Amortization |
| | Aircraft in operations |
| | Aircraft deposits and other assets |
| | Alaska coalmine and related equipment |
| | Alternativeenergy and wasterecycling |
| | Alternativeenergy facilities |
| | Apartment Properties at Cost |
| | Asset retirement costs |
| | Assets under arrangement with other parties, net |
| | At original cost, including nuclear fuel and construction work in progress |
| | Attractions, buildings and equipment |
| | Audio Equipment |
| | Auto redistribution operations |
| | Automative equipment |
| | Aviation equipment |
| | Bank Premises |
| | Barges and improvements |
| | Electric generation plant |
| | Electric includes construction work |
| | Electric operating revenues |
| | Electric plant in service and held for future use |
| | Fixed and Other Assets |
| | Fixed asset deposits and other |
| | Fixed assets, net accumulated depreciation |
| | Gas property and plant |
| | Gas systems |
| | Gas transmission |
| | Gas transportation |
| | Gas utility |
| | Video equipment |
| | Video lottery equipment |
| | Well and field equipment |
| | Wellness Casinos, Inc |
| | Wells & related equipment |
| | Wells and related equipment |

APPENDIX II -continued

| Exemplary Standard (Enhanced XBRL) Terms | Exemplary Company-Specific Terms |
|---|---|
| | Wireless internet access system |
| | Yard equipment |

APPENDIX III

Main Process/Tools:
  DataExtraction/Storage
  Mapping Interface
  Validation/Mismatch Interface
  Statement Interface
  Fundamental Financials Interface DataExtraction/Storage Perl based processes, running on Windows machine to extract the specific financial information (Balance Sheet/Income Statement/Cash Flow) from the filings (filed by company under SEC) using Oracle to store data. Under this category we have three-different type of sub-processes, having nearly same type of functionality:
  Balance Sheet Extraction
  Cash Flow Extraction
  Income Statement Extraction For convenience, various elements of the balance sheet extraction process are described below, and it will be apparent that the cash flow extraction process and the income statement extraction process include similar elements.

The balance sheet extraction process contains three-different sub processes to fulfill the requirement of the balance sheet extraction.
  1. Statement Search
  2. Taxonomy Generation
  3. Data Storage 1. Statement Search: This process uses Perl files to locate financial statements in the company financial report (using keywords) and to store the statement position in database: Two such files are described below, as an example:
  SearchFile1.pl
  SearchFile2.pl SearchFile1.pl:

According to input parameters, this file parses a number of filings (e.g. if the user provides the CIK for a selected company, the file will parse all filings for the selected company). This file includes the "SearchFile2" as a library file, to use its methods.

Few Examples of Main Methods are:
  Method1: This method takes one filing as parameter to process.
  This method will take care of multiple statements in single filing. Method will arrange all possible statements from filing in CIK/TICKER combinations. Method uses the helper method from SearchFile2 and others to get the CIK/TICKER and other information.
  Method2: This method will store positions into the database table (BAL_POS)

This file also uses several other "helper" methods to perform various functions.

SearchFile2.pl

This is a generic file stored in the Perl library. It can be used to get the statement according to the position or to find out the statement position initially.

Few Examples of Main Methods are:
  Method1: Taking path of raw filing as a parameter and using keywords, this method tracks down the financial statement.
  Method2: This method takes start position, end position and filing as parameters to get the statement. Also, this method will format the html content to the text. This method is used by the program to extract values and associate the values to standard line items.
  Method3: This method will return the exact content of html filings without formatting to text.

This file also uses several other "helper" methods to perform various functions.

2. Taxonomy Generation: The Perl files in this process are used to generate the library of distinct line items. As a result, the line items (as in filing) can be mapped to a standard line item using the mapping interface. In the end this mapping will be used to associate values to the standard line items. One such file is described below, as an example:
  TaxonomyFile1.pl TaxonomyFile1.pl:

This file includes the "SearchFile2.pl" file to get the statement, parse the statement line by line, and store the unique line items to map.

Few Examples of Main Methods are:
  Method1: Taking filing number as parameter, take out all cik/ticker from database related to the filing number and pass it on to other common method.
  Method2: This method takes filing number, cik and ticker as parameters to get and parse the statement.
  Method3: This method takes the statement string as a parameter to parse it line by line. Each line is cross-checked against the database for its existence. To keep track of each line item, a dummy of the line item is created by removing all characters that are not alphabetic [a-z]. This dummy is used for mapping/unmapping of the line item. (e.g. "Cash & Cash" dummy will be "CASHCASH"). Three different combinations of a line item is stored in the database:
    1. Line Item already in database (Do Not Store).
    2. Different line item, with the same dummy (not mapped) (Store).
    3. Different line item with the same dummy (mapped) (Store & map).

This file also uses several other "helper" methods to perform various functions.

3. Data Storage: The Perl files in this process extract the data from individual filings according to the mapping and structure of the filing. Further it maps the data to the standard datapoint and stores it in the database (where one column represents the one specific standard datapoint). One such file is described below, as an example:
  DataStorageFile1.pl DataStorageFile1.pl: This file also includes the "SearchFile2.pl" to get the real statement as well as formatted statements (for HTML filings). This file includes several methods/functionality to extract the data and associate it to the standard datapoints. Further, this file keeps track of validation for all parent child relationships. If validation fails, this process sets a different status for the filing. This failed filing is addressed at a later time using the validation/mismatch interface. This file takes several different parameters to extract filings.

Few Examples of Main Methods are:

Method1: Takes filing number as a parameter. It takes out all cik/ticker from the database related to the filing number and passes it on to other common methods.

Method2: This method takes filing number, cik and ticker as parameters to get and parse the statement.

Method3: This method takes the statement string as a parameter to parse it line by line. It then sets two different arrays for asset and liabilities. Then, locates the period to be extracted. It also checks for the currency units and parses asset/liability or both according to the parameter.

Method4: Parses the asset's array line items. Extracts the value from line item, check the standard datapoint from database for line item and associates the values according to the line item hierarchy in the filing. Method is capable of extracting/associating the values in multiple lines.

Method5: Same functionality as Method4, but parses the liabilities line items.

Method6: Generic function to get the value from any line item.

Method7: Checks the parent-child values/relationship for asset section.

Method8: Stores the asset section data in the table.

Method9: Checks the parent-child values/relationship for the liability section.

Method10: Stores the liability section data in the table.

This file also uses several other "helper" methods to perform various functions.

Parent-Child Interface

This client-server application is used to create the link list between all headings and sub-headings for "as-in-filing" line items that have failed the in-build logic to automatically understand such relationships. The in-build logic is continuously enhanced over time after studying "as-in-filling" line items queued up in this module.

Mapping Interface

The mapping interface is a web based client-server application (uses IIS, ASP and Oracle). It is used to map distinct line items to the standard Enhanced XBRL line items. Users can access the complete hierarchy for Balance, Cash and Income. Search tools allow user to view the mapping of the line items to the standard datapoint. The mapping interface provides many different features to assist in mapping.

Validation/Mismatch Interface

The validation/mismatch interface is a web based client-server application (uses IIS, ASP and Oracle). This interface presents to the user the files failing the validation check. The validation/mismatch interface shows the 'parent-child' values with anchors to the source file. Anchors are created on-line in the source file only for the specific value selected by the user. Through the validation/mismatch interface, users can analyze the mismatch and/or fix the mismatch or write comments for modification at a later date. The files are preferably checked and the fixes are redeployed every.

Statement Interface

The statement interface shows "as in filing" financials (based on each filing information), for example:

Quarterly Report of Small Business (10QSB)—11/19/2003

Three different ASP files are used to show the Balance Sheet/Income Statement/Cash Flow statements, respectively, along with start and end offsets as located by the program. Users have an option to download the data in an excel spreadsheet.

Fundamental Financials Interface

The "fundamental financials" interface is a web based client-server application (using IIS, ASP and Oracle). This interface shows standardized financial reports for a company based on a company, year, and the frequency (Quarterly/Annual). This interface also displays "Customizable Enhanced XBRL data elements (including derived data elements)" for Press Releases, 8Ks and Quarterly/Annual reports for all prior years, for all companies. Customization is allowed for all three financial statements, using web based on-screen selection of Enhanced XBRL data elements. Derived elements based on a mathematical formula created using functions including addition, subtraction, multiplication and/or division of Enhanced XBRL elements and/or other derived elements is also possible. Renaming a data element is allowed for actual and derived elements. After this customization, all results are displayed for the element set for the company. The mapping function may keep track of all footnote references in the 'as in filing' line items, indicate such a reference with an asterisk on the equivalent Enhanced XBRL line items, and "hyperlink" the asterisk to the line item with a footnote reference in the 'as in filing.'

What is claimed is:

1. A computer-implemented method for producing a standardized financial report from a company financial report, the company financial report including a plurality of line items, each line item including at least a company-specific term and a corresponding value, the method comprising:

maintaining a taxonomy library in a computer-readable medium, wherein the taxonomy library maps each of a number of company-specific terms to at least one corresponding standard term;

mapping, by a specially programmed computer processor in communication with the computer-readable medium, a company-specific term from a line item in the company financial report to a corresponding standard term in the taxonomy library; and generating a standardized financial report having a plurality of standardized line items, wherein at least one standardized line item incorporates the standard term and the corresponding value from the line item in the company financial report, and a link to the source of the value in the company financial report.

2. A method according to claim 1, wherein mapping a company-specific term from a line item in the company financial report to a corresponding standard term in the taxonomy library comprises:

parsing the company financial report to identify each line item; and parsing each line item to obtain its respective company-specific term and corresponding value.

3. A method according to claim 2, wherein mapping a company-specific term from a line item in the company financial report to a corresponding standard term in the taxonomy library further comprises:

building a hierarchical linked list of line items in the company financial report.

4. A method according to claim 1, wherein mapping a company-specific term from a line item in the company financial report to a corresponding standard term in the taxonomy library comprises:

converting the company-specific term to a neutral identifier; and searching the taxonomy library for the neutral identifier.

5. A method according to claim 1, further comprising:
highlighting the value in the standardized financial report.

6. A method according to claim 5, wherein highlighting the value in the standardized financial report comprises:
encoding the value so that it will be displayed in a distinctive color.

7. A method according to claim 1, further comprising:
cross-referencing the value in the standardized financial report to its source location in the company financial report.

8. A method according to claim 7, wherein cross-referencing the value in the standardized financial report to its source location in the company financial report comprises:
hyperlinking the selected line items and value to its source location in the company financial report.

9. A method according to claim 1, further comprising:
storing the company financial report in a database; and
storing the standardized financial report in the database.

10. A method according to claim 1, further comprising:
displaying the standardized financial report through a web interface.

11. A method according to claim 10, further comprising:
receiving a user input selecting the value from the standardized line item; and
displaying at least a portion of the company financial report including the value.

12. A method according to claim 1, wherein the standardized line item includes said corresponding value.

13. A method according to claim 1, wherein the standardized line item includes a value derived from said corresponding value.

14. A method according to claim 1, further comprising:
obtaining the company financial report from a remote server over a communication network.

15. Apparatus for producing a standardized financial report from a company financial report, the company financial report including a plurality of line items, each line item including at least a company-specific term and a corresponding value, the apparatus comprising:
a database having stored therein a taxonomy library, wherein the taxonomy library maps each of a number of company-specific terms to at least one corresponding standard term;
a computer processor in communication with the database, the computer processor configured with financial reporting computer program logic to map a company-specific term from a line item in the company financial report to a corresponding standard term in the taxonomy library and generate a standardized financial report having a plurality of standardized line items, wherein at least one standardized line item incorporates the standard term and the corresponding value from the line item in the company financial report, and a link to the source of the value in the company financial report.

16. Apparatus according to claim 15, wherein the financial reporting logic is operably coupled to parse the company financial report to identify each line item and parse each line item to obtain its respective company-specific term and corresponding value.

17. Apparatus according to claim 16, wherein the financial reporting logic is operably coupled to build a hierarchical linked list of line items in the company financial report.

18. Apparatus according to claim 15, wherein the financial reporting logic is operably coupled to convert the company-specific term to a neutral identifier and search the taxonomy library for the neutral identifier.

19. Apparatus according to claim 15, wherein the financial reporting logic is operably coupled to highlight the value in the standardized financial report.

20. Apparatus according to claim 19, wherein the financial reporting logic is operably coupled to highlight the value in the standardized financial report by encoding the value so that it will be displayed in a distinctive color.

21. Apparatus according to claim 15, wherein the financial reporting logic is operably coupled to cross-reference the value in the standardized financial report to its source location in the company financial report.

22. Apparatus according to claim 21, wherein the financial reporting logic is operably coupled to cross-reference the value in the standardized financial report to its source location in the company financial report by hyperlinking the value to its source location in the company financial report.

23. Apparatus according to claim 15, further comprising a web interface, wherein the financial reporting logic is operably coupled to display the standardized financial report through the web interface.

24. Apparatus according to claim 23, wherein the financial reporting logic is operably coupled to display at least a portion of the company financial report including the value upon receiving a user input selecting the value from the standardized line item.

25. Apparatus according to claim 15, wherein the financial reporting logic is operably coupled to include said corresponding value in the standardized line item.

26. Apparatus according to claim 15, wherein the financial reporting logic is operably coupled to derive a value from said corresponding value and include said derived value in the standardized line item.

27. A computer-readable medium having embodied therein a computer program that, when run on a computer processor, produces a standardized report from a non-standardized report, the non-standardized report including at least a non-standardized term and a corresponding value, the computer program causing the computer processor to:
map the non-standardized term from the non-standardized report to a corresponding standard term using a taxonomy library that maps each of a number of non-standardized terms to at least one corresponding standard term; and
generate a standardized report incorporating the standard term and the corresponding value from the non-standardized report, and including a link to the source of the value in the non-standardized report which includes the non-standardized term.

\* \* \* \* \*